United States Patent
Watanabe et al.

(10) Patent No.: US 9,952,670 B2
(45) Date of Patent: Apr. 24, 2018

(54) OPERATION PANEL AND IMAGE FORMING APPARATUS INCLUDING THE SAME

(71) Applicant: Konica Minolta, Inc., Chiyoda-ku, Tokyo (JP)

(72) Inventors: Isao Watanabe, Toyohashi (JP); Hiroshi Yamaguchi, Toyokawa (JP); Toshikazu Higashi, Toyokawa (JP); Mineo Yamamoto, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 73 days.

(21) Appl. No.: 15/232,582

(22) Filed: Aug. 9, 2016

(65) Prior Publication Data

US 2017/0045991 A1    Feb. 16, 2017

(30) Foreign Application Priority Data

Aug. 11, 2015    (JP) .................................. 2015-159047

(51) Int. Cl.
*G06F 3/01* (2006.01)
*H04N 1/00* (2006.01)

(52) U.S. Cl.
CPC ......... *G06F 3/016* (2013.01); *H04N 1/00411* (2013.01); *H04N 2201/0094* (2013.01)

(58) Field of Classification Search
CPC ................ G06F 3/016; H04N 1/00411; H04N 2201/0094
See application file for complete search history.

(56) References Cited

U.S. PATENT DOCUMENTS

| 2011/0012717 A1* | 1/2011 | Pance | G06F 3/016 340/407.2 |
| 2014/0184540 A1* | 7/2014 | Fukuoka | G06F 3/0416 345/173 |
| 2014/0292691 A1* | 10/2014 | Sugiyama | G06F 3/016 345/173 |

(Continued)

FOREIGN PATENT DOCUMENTS

| JP | 2006-040005 A | 2/2006 |
| JP | 2008-217237 A | 9/2008 |

(Continued)

*Primary Examiner* — Ibrahim A Khan
(74) *Attorney, Agent, or Firm* — Buchanan Ingersoll & Rooney PC

(57) ABSTRACT

An operation panel that is incorporated in an apparatus generating vibration during operation, and displays an operation screen of the apparatus to receive operation from a user includes: a touch panel that includes a display area of the operation screen, and detects contact between an external object and the display area; a vibration generation unit that applies vibration to the display area; a vibration storage unit that stores a spectrum of vibration generated by operation of the apparatus as a spectrum of background vibration; and a response control unit that checks whether the apparatus is in a standby state or an operating state, and causes the vibration generation unit to apply vibration indicating a first spectrum to the display area when the apparatus is in the standby state, and vibration indicating a second spectrum to the display area when the apparatus is in the operating state.

12 Claims, 16 Drawing Sheets

(56) References Cited

U.S. PATENT DOCUMENTS

| | | | | |
|---|---|---|---|---|
| 2015/0116770 A1* | 4/2015 | Tanaka | ............... | G06F 3/04886 358/1.15 |
| 2015/0185847 A1* | 7/2015 | Shirai | ................... | G06F 3/016 345/174 |
| 2016/0063828 A1* | 3/2016 | Moussette | ............... | G08B 6/00 340/540 |
| 2016/0103490 A1* | 4/2016 | Sugiyama | ............... | G06F 3/016 345/173 |
| 2016/0373597 A1* | 12/2016 | An | ................... | H04N 1/00411 |

FOREIGN PATENT DOCUMENTS

| JP | 2011-113461 A | 6/2011 |
|---|---|---|
| JP | 2012-038289 A | 2/2012 |
| JP | 2012-176640 A | 9/2012 |

\* cited by examiner

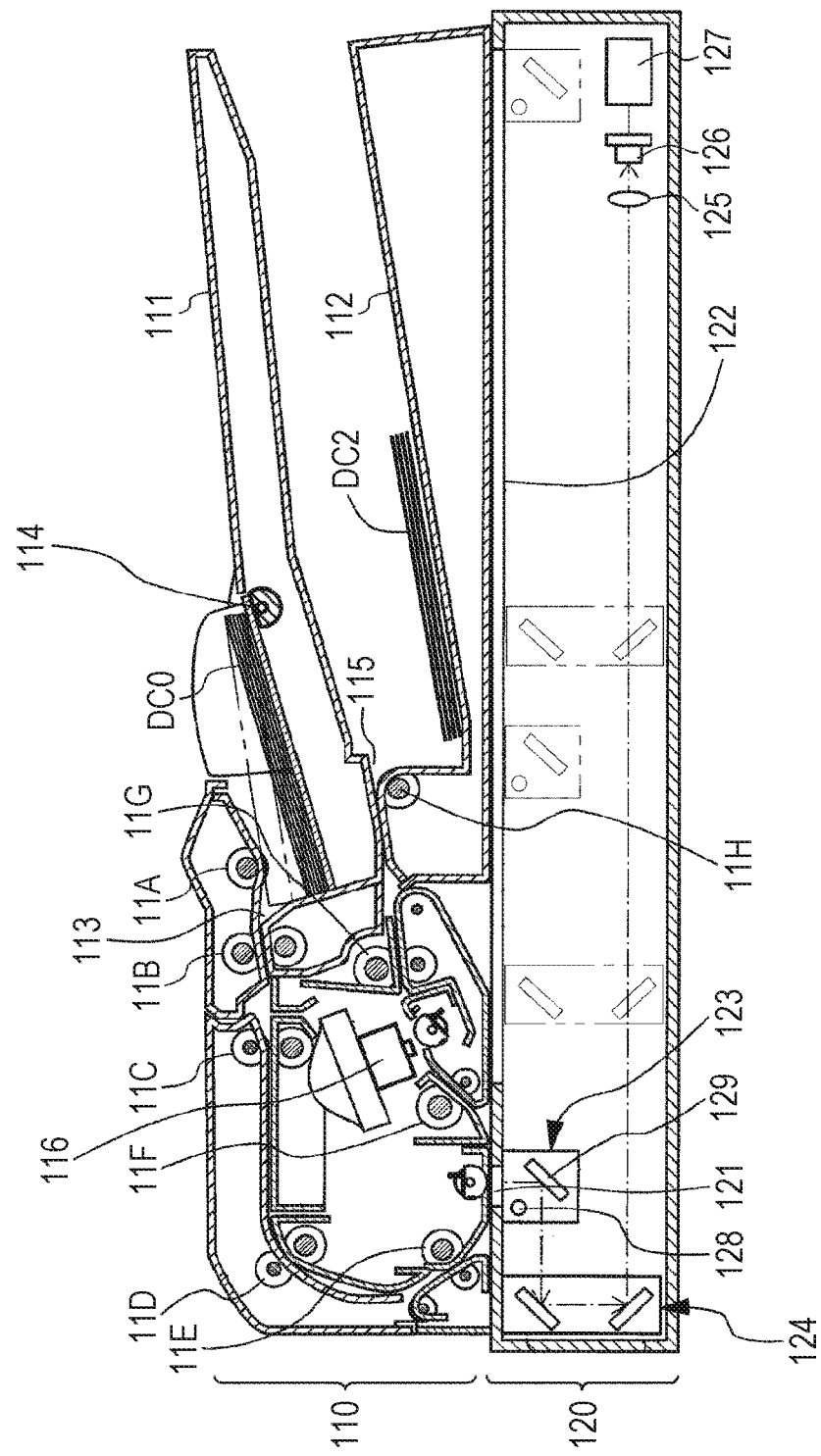

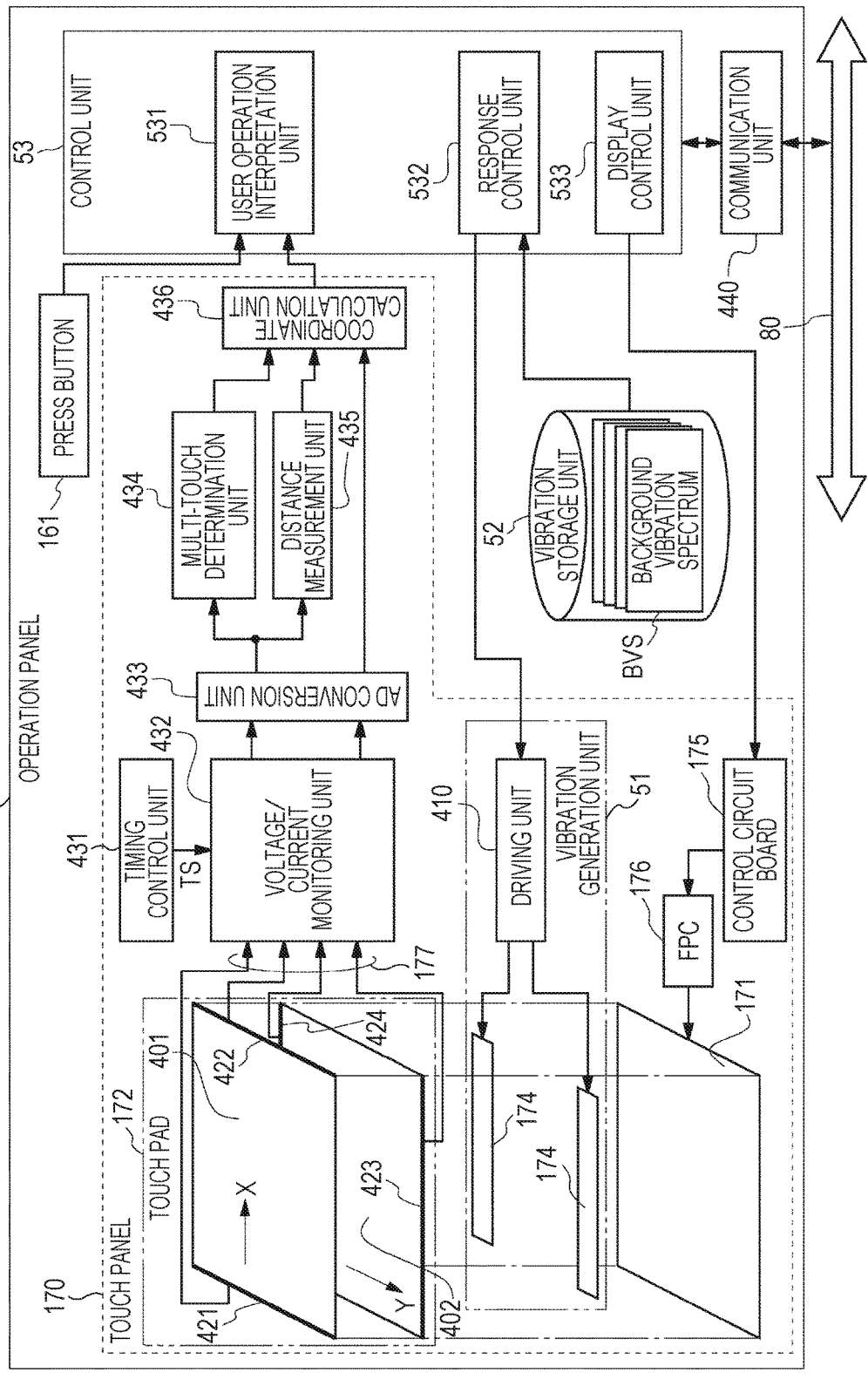

FIG. 5A
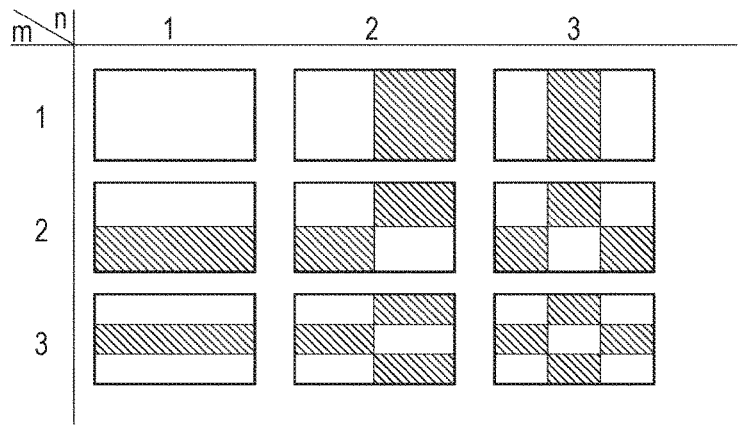
FIG. 5B
(m, n) = (1, 1)   (m, n) = (1, 2)   (m, n) = (2, 1)
FIG. 5C
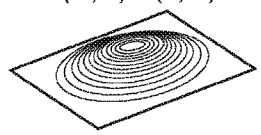 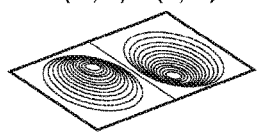 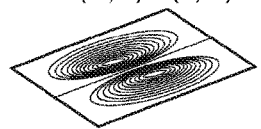
FIG. 5D
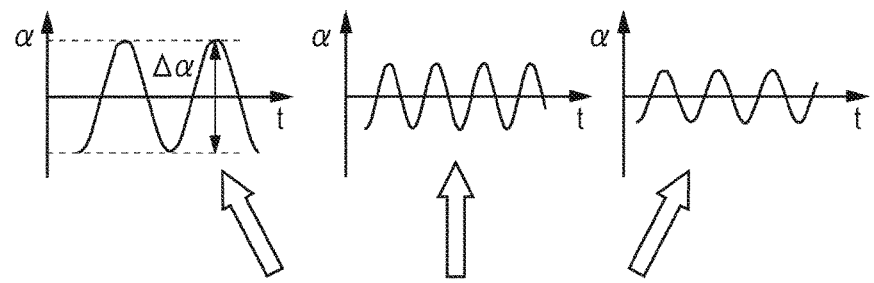
FIG. 5E
| MFP OPERATION MODE | AMPLITUDE FOR EACH NATURAL VIBRATION MODE Δα [dB] | | | |
| --- | --- | --- | --- | --- |
| | (m, n) = (1, 1) | (1, 2) | (2, 1) | ... |
| COPY | 32 | 16 | 14 | ... |
| PRINT | 30 | 15 | 13 | ... |
| SCAN | 25 | 12 | 11 | ... |

| MFP OPERATION MODE: COPY |||||
|---|---|---|---|---|
| NATURAL VIBRATION OF PANEL (m, n) | (AMPLITUDE $\Delta\alpha k$ [dB], CONTINUATION TIME $\Delta tk$ [m SEC]) ||||
| | k = 1 | 2 | 3 | ... |
| (1, 1) | (28, 250) | (36, 300) | (24, 270) | ... |
| (1, 2) | (15, 120) | (23, 400) | – | ... |
| ⋮ | ⋮ | ⋮ | ⋮ | ... |

OPERATION PANEL AND IMAGE FORMING APPARATUS INCLUDING THE SAME

The entire disclosure of Japanese Patent Application No. 2015-159047 filed on Aug. 11, 2015 including description, claims, drawings, and abstract are incorporated herein by reference in its entirety.

BACKGROUND OF THE INVENTION

Field of the Invention

The present invention relates to an image forming apparatus, and more particularly to a technology which vibrates a touch panel incorporated in an operation panel of this apparatus to respond to detected contact with the touch panel.

Description of the Related Art

Touch panels have become essential input devices for operation of electric devices. At present, touch panels have been included as standard equipment in any automatic teller machines (ATM) at any banks, and any automatic ticket vending machines at any stations. Moreover, touch panels have been included as standard equipment in both smartphones and tablet-type devices having become widespread explosively. In recent years, touch panels have been also incorporated in operation panels of a growing number of home appliances.

This widespread of touch panels is chiefly realized by a preferable operational feeling that a user may have when he or she operates a touch panel. A user operating a touch panel is only required to directly touch icons, virtual buttons or other graphic user interface (GUI) parts (hereinafter referred to as gadgets) displayed on an operation screen of the touch panel and operate the gadgets. In other words, the user is not required to operate either a keyboard or a mouse. Accordingly, even a user unfamiliar with handling of a keyboard or a mouse does not become confused during operation of the gadgets. Because of this easiness in handling, the user has a preferable operational feeling for operation of the touch panel.

For example, there is known a touch panel in a conventional technology which responds to detected contact by emitting light or sound for improving an operational feeling of a user. More specifically, this type of touch panel changes modes of gadgets such as colors, shapes, luminance and the like on a display, or emits electronic sound from a speaker when detecting contact with a finger of a user. The user having received this visual or auditory response senses a "response" (or referred to as "click feeling" or "feedback") to the contact made by a touch to the touch panel. In other words, the user understands that operation input by the contact has been received by the device.

More recently, a touch panel having a force feedback (FFB) function has been developed as a technology for further improving this feedback effect (for example, see JP 2012-176640 A, JP 2012-038289 A, JP 2011-113461 A, JP 2008-217237 A, and JP 2006-040005 A). The "FFB function" in this context refers to a function for vibrating a touch panel (particularly a surface of the touch panel receiving a touch from a user) in response to contact detection by the touch panel. When a user receives this vibration (hereinafter referred to as "response vibration") in response to a touch to a virtual button or the like, the user feels as if he or she has pressed a mechanical button. The response vibration is a tactile response, wherefore even children, aged persons or other users who are relatively not good at sensing mode changes of gadgets or electronic sounds securely sense this type of response vibration.

The use of touch panels spreads even to in-vehicle electronic devices such as car audio systems and car navigation systems, image forming apparatuses such as printers and copying machines, and machine tools such as industrial robots. A user operating a device of these types generally does not keep watching only a touch panel. Moreover, operational sound or environmental noise generated from these devices is generally large, wherefore electronic sound is difficult to reach the user. Accordingly, it is more preferable that a touch panel incorporated in a device of these types has the FFB function for improving an operational feeling of the user during operation of the touch panel of the device.

However, the in-vehicle electronic devices, image forming apparatuses, mechanical tools and the like generate large vibration during operation of these devices, or operation of systems incorporating these devices, such as cars. Accordingly, there has been a demand for such a technology which allows the user to securely sense response vibration of the touch panel generated by the FFB function even in the presence of vibration from the devices or systems (hereinafter referred to as "background vibration").

An in-vehicle touch panel disclosed in JP 2012-176640 A is an example of conventional technologies for meeting this demand. According to this technology, the touch panel detects vibration of a vehicle body generated during traveling of a vehicle, and amplifies response vibration in accordance with increase in the amplitude of the vibration of the vehicle body.

According to this technology, however, detection of the background vibration is required at the time of generation of the response vibration. In this case, a delay between contact detection by the touch panel and output of the response vibration in response to the detection is always produced. In addition, variations of the delay are difficult to reduce. Accordingly, amplification of the response vibration in accordance with the background vibration needs to be optimized to allow the user to securely sense the response vibration. However, an effective solution is not easy to achieve at present even by those skilled in the art.

SUMMARY OF THE INVENTION

An object of the present invention is to solve the aforementioned problems, and particularly to provide an operation panel allowing a user to securely sense response vibration in response to detected contact even in the presence of background vibration generated by operation of a device incorporating the operation panel.

To achieve the abovementioned object, according to an aspect, an operation panel that is incorporated in an apparatus generating vibration during operation, and displays an operation screen of the apparatus to receive operation from a user through the operation screen, reflecting one aspect of the present invention comprises: a touch panel that includes a display area of the operation screen, and detects contact between an external object and the display area; a vibration generation unit that applies vibration to the display area; a vibration storage unit that stores a spectrum of vibration generated by operation of the apparatus as a spectrum of background vibration; and a response control unit that checks whether the apparatus is in a standby state or an operating state in response to contact detection by the touch panel, and causes the vibration generation unit to apply, in response to the contact, vibration indicating a first spectrum to the display area when the apparatus is in the standby state, and vibration indicating a second spectrum to the display area when the apparatus is in the operating state. The response control unit sets a difference between the first spectrum and the second spectrum or a ratio of the first spectrum to the second spectrum for each of natural frequencies of the display area based on the spectrum of the background vibration.

The response control unit preferably adds a vibration level of at least any one of frequency components contained in the spectrum of the background vibration to a vibration level of an identical frequency component contained in the first spectrum, and sets the sum of the vibration levels to a vibration level of an identical frequency component contained in the second spectrum.

The response control unit preferably adds a frequency component not contained in the spectrum of the background vibration to the first spectrum, and sets the resultant spectrum to the second spectrum.

The vibration storage unit preferably further stores a change with time produced in the spectrum of the background vibration during a period from a start of a series of operations performed by the apparatus to an end of the operations. The response control unit preferably measures an elapsed time from the start of the series of operations performed by the apparatus, and determines a spectrum of the background vibration to be used for setting the second spectrum based on a measurement of the elapsed time at the time of detection of the contact detected by the touch panel. Specifically, the apparatus is preferably an image forming apparatus. In this case, the change with time produced in the spectrum of the background vibration stored in the vibration storage unit preferably indicates a change with time produced when the image forming apparatus prints one sheet.

The vibration storage unit preferably stores the spectrum of the background vibration for each operation mode of the apparatus. The response control unit preferably identifies the operation mode of the apparatus, and determines the spectrum of the background vibration to be used for setting the second spectrum in accordance with the identified operation mode when the apparatus is in the operating state at the time of detection of the contact detected by the touch panel. Specifically, the apparatus is preferably a copying machine. In this case, the vibration storage unit preferably separately stores the spectrum of the background vibration for each of a scanning mode, a copying mode, and a printing mode.

The operation screen preferably includes a setting screen associated with vibration to be generated by the vibration generation unit. The response control unit preferably corrects the second spectrum in accordance with operation by the user through the setting screen. Specifically, the correction of the second spectrum by the response control unit preferably includes increase or decrease in the vibration level, or setting of an upper limit or a lower limit for the vibration level.

The operation panel preferably further comprises a monitoring unit that monitors total operation time of the apparatus. The response control unit preferably corrects the spectrum of the background vibration in accordance with the total operation time indicated by the monitoring unit. Specifically, the apparatus is preferably an image forming apparatus. In this case, the monitoring unit preferably estimates the total operation time based on the total number of sheets processed by the image forming apparatus, or the total amount of toner or ink consumed by the image forming apparatus.

To achieve the abovementioned object, according to an aspect, an image forming apparatus reflecting one aspect of the present invention comprises: an image forming unit that forms an image on a sheet; and the operation panel described above, the operation panel displaying an operation screen for the image forming unit to receive operation from a user through the operation screen.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 1A is a perspective view of an external appearance of an image forming apparatus according to an embodiment of the present invention, while

FIG. 2A is a cross-sectional view of an auto document feeder and a scanner illustrated in FIG. 1A and taken along a line II-II, while

FIG. 4 is a function block diagram of an operation panel illustrated in FIGS. 1A and 1B;

FIG. 5A is a list showing node curves in natural vibration modes (m=1 through 3, n=1 through 3) of the touch panel illustrated in FIG. 1B, FIG. 5B is a schematic view illustrating vibration shapes of the natural vibration modes (m, n)=(1, 1), (1, 2), and (2, 1), FIG. 5C shows graphs of vibration waveforms in the respective natural vibration modes illustrated in FIG. 5B, FIG. 5D is a graph of a vibration waveform actually generated in the touch panel, and FIG. 5E is a table showing spectrums of background vibration stored in a vibration storage unit illustrated in FIG. 4;

FIG. 11A is a graph showing a change with time produced in one of frequency components of background vibration during a period of one sheet copying by the image forming apparatus, while FIG. 11B is a correspondence table of a natural frequency mode producing a change with time in the spectrum of the background vibration stored in the vibration storage unit, and continuation time for each amplitude;

FIG. 14A is a graph showing a correlation between the total number of sheets processed by the image forming apparatus and an aging coefficient, while

DESCRIPTION OF THE PREFERRED EMBODIMENTS

Hereinafter, an embodiment of the present invention will be described with reference to the drawings. However, the scope of the invention is not limited to the illustrated examples.

[External Appearance of Image Forming Apparatus]

Figure 1A:
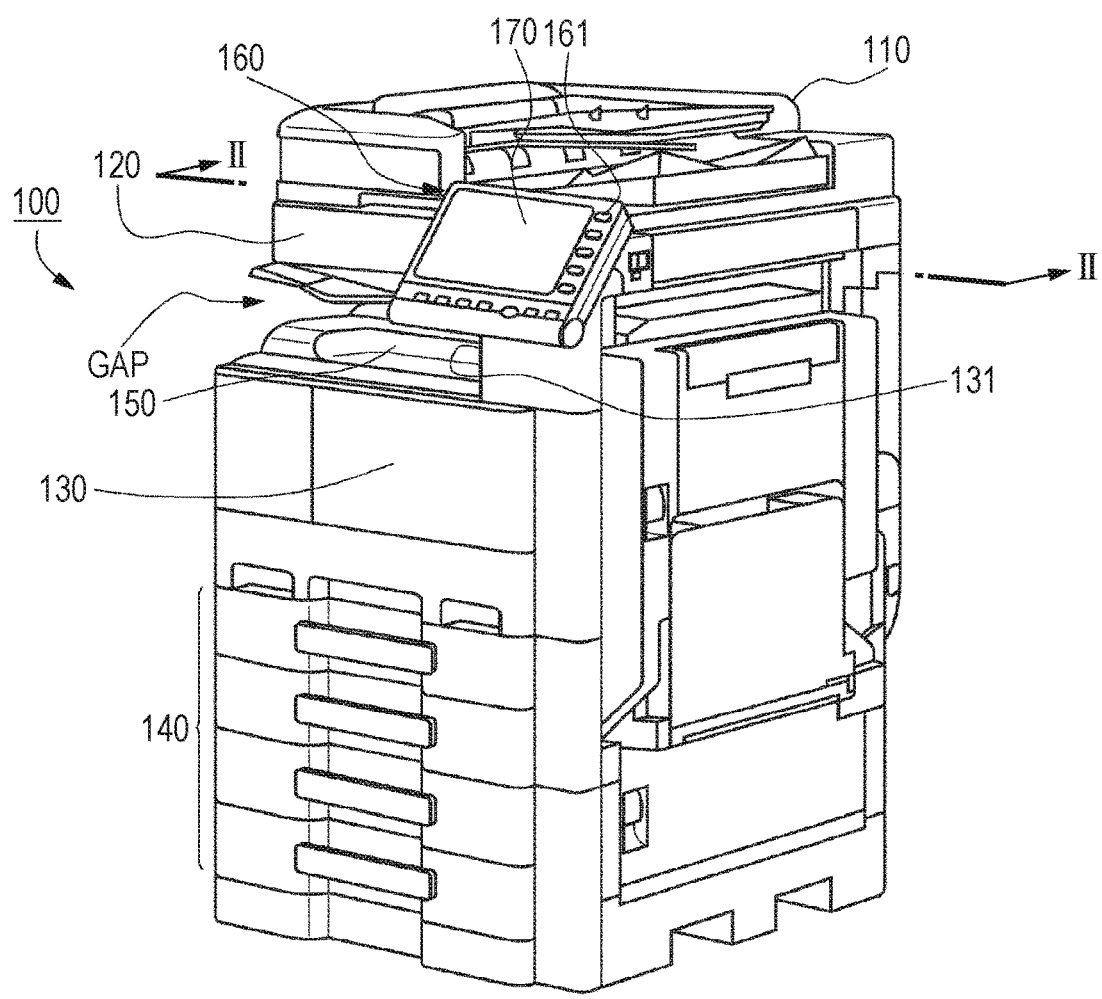

FIG. 1A is a perspective view illustrating an external appearance of an image forming apparatus according to the present invention. An image forming apparatus 100 in this embodiment is an in-body paper discharge type multi-function peripheral (MFP), functioning as a scanner, a color copying machine, and a color laser printer. As illustrated in FIG. 1A, an openable and closable auto document feeder (ADF) 110 is attached to an upper surface of a housing of the MFP 100. A scanner 120 is provided in an upper part of the housing immediately below the ADF 110. A printer 130 is provided below the scanner 120. Feed cassettes 140 are attached to a bottom part of the housing below the printer 130 in such a condition as to be freely drawn out. A clearance GAP is formed between the scanner 120 and the printer 130. A discharge tray 150 is disposed within the clearance GAP. A discharge port 131 is formed on the inner side of the clearance GAP. A sheet is discharged from the discharge port 131 to the discharge tray 150. An operation panel 160 is attached to a part of the front surface of the housing in an area on the side of the clearance GAP. A touch panel 170 is embedded in the front surface of the operation panel 160. Various types of mechanical press buttons 161 are disposed in the periphery of the touch panel 170. The touch panel 170 displays GUI screens such as an operation screen and an input screen through which various types of information is input, and receives input operation from a user through gadgets such as icons, virtual buttons, menus, and tool bars contained in the GUI screens.

[Structure of Touch Panel]

Figure 1B:
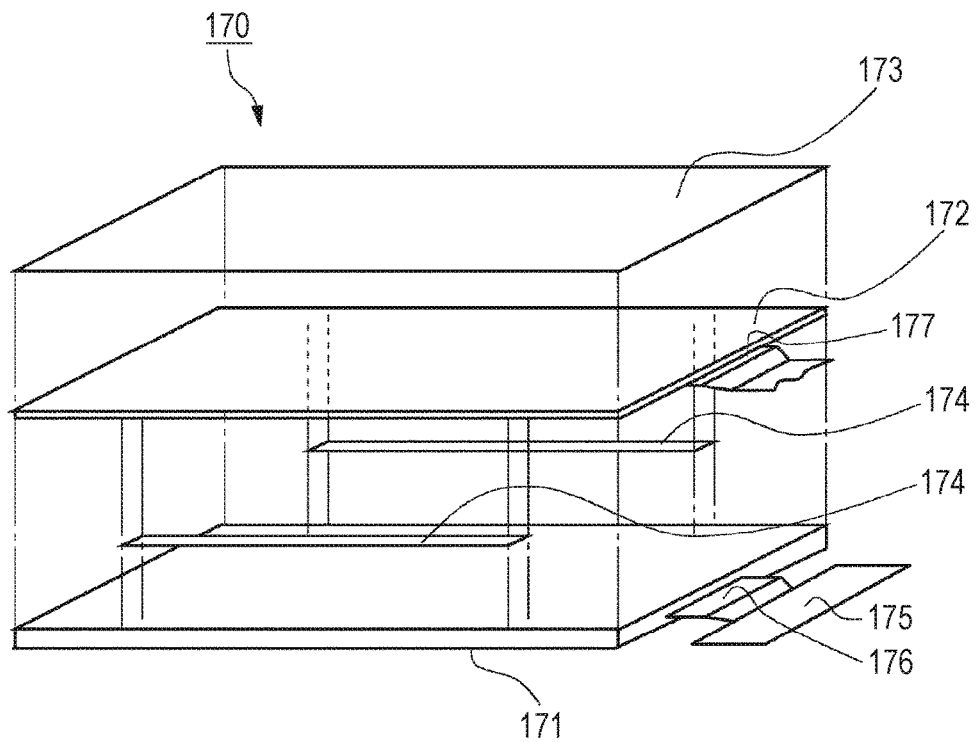
FIG. 1B is an exploded perspective view of a touch panel mounted on this image forming apparatus.

FIG. 1B is an exploded perspective view of the touch panel 170 illustrated in FIG. 1A. As illustrated in FIG. 1B, the touch panel 170 includes a laminated structure constituted by a liquid crystal display (LCD) 171, a touch pad 172, a cover 173, and piezoelectric actuators 174.

The LCD 171 receives uniform light from a backlight, and modulates the light for each pixel in accordance with voltage applied from a control circuit board 175 via a flexible printing circuit board (FPC) 176. As a result, luminance of the screen changes for each pixel to display an image on the screen.

The touch pad 172 laminated on the screen of the LCD 171 includes a resistive film system structure, for example. More specifically, a transparent conductive film made of indium tin oxide (ITO) or the like covers the upper surface of a substrate made of transparent glass or the like. Another transparent conductive film further extends over the foregoing film with a spacer interposed between these films. The two conductive films are connected to an external electronic circuit via a cable 177 to alternately receive supply of currents from this circuit. When a finger of the user contacts the touch panel 170 in this condition, the contact portion of the upper conductive film is recessed and short-circuited with the lower conductive film. As a result, the potential of the conductive film not receiving supply of currents changes. The contact of the finger is detected based on the change of the potential. The coordinates of the contact point are calculated based on the amount of the change.

The cover 173 is a transparent film which is made of resin such as polyethylene terephthalate (PET), and covers the upper surface of the touch pad 172 to protect the touch pad 172 from external dust and moisture.

Each of the piezoelectric actuators 174 is a band-shaped thin-film member constituted by a piezoelectric substance such as lead zirconate titanate (PZT). For example, several sheets (two sheets in FIG. 1B) of the piezoelectric actuators 174 are bonded to the peripheral edge of the touch pad 172 along the circumference of the touch pad 172. Each of the piezoelectric actuators 174 deforms (extends in the longitudinal direction, for example) when voltage is applied thereto from the outside, and returns to the original shape (to the original length, for example) when the applied voltage is removed. Accordingly, when voltage is applied repeatedly and cyclically, the piezoelectric actuator 174 vibrates at the frequency of vibration equivalent to the frequency of the cycle.

[Structure of ADF]

FIG. 2A is a cross-sectional view of the ADF 110 illustrated in FIG. 1A and taken along a line II-II. As illustrated in FIG. 2A, the ADF 110 introduces a document DC0 one by one from an upper part of a feed tray 111 into a feed port 113 by using a feed roller 11A. The ADF 110 then delivers the document DC0 from the feed port 113 toward a discharge port 115 along a delivery path by using delivery rollers 11B through 11G, and discharges the document DC0 from the discharge port 115 by using a discharge roller 11H. A document DC2 discharged from the discharge port 115 is stored in a discharge tray 112. While the document is passing through the delivery path, the front surface of the document positioned on the bottom of the ADF 110 is scanned by irradiation light emitted from the scanner 120. On the other hand, the rear surface of the document positioned inside the ADF 110 is scanned by irradiation light emitted from a rear surface scanner 116.

[Structure of Scanner]

FIG. 2A further shows a cross-sectional view of the scanner 120 illustrated in FIG. 1A and taken along a line II-II. As illustrated in FIG. 2A, a contact glass 121 which closes a slit opened in the upper surface of the scanner 120 faces a part of the delivery path of the document exposed to the bottom surface of the ADF 110. The scanner 120 applies light from the contact glass 121 side to the front surface of the document passing through the foregoing part of the delivery path to detect reflection light reflected on the document. A platen glass 122 provided on the upper surface of the scanner 120 also closes an opening different from the slit closed by the contact glass 121. The scanner 120 applies light from the platen glass 122 side to apply the light to the front surface of the document carried on the platen glass 122 to detect reflection light reflected on the document.

A slider 123 is provided inside the scanner 120 in a condition reciprocatively movable between a position immediately below the contact glass 121 and an end of the platen glass 122. The slider 123 applies light of a line light source 128 from the upper surface of the slider 123 via the contact glass 121 or the platen glass 122 toward the front surface of the document. The slider 123 further receives light reflected on the front surface of the document and entering through the upper surface of the slider 123, and reflects the received light toward a pair of mirrors 124 and a lens 125 by using a mirror 129. Optical elements 124 and 125 focus this reflection light. A line sensor 126 detects an amount of the reflection light. This amount of light varies in accordance with the color (more precisely, light reflectance) of the front surface of the document, wherefore an electric signal output from the line sensor 126 in accordance with detection of the amount of light represents an image displayed on the front surface of the document. Similarly, an electric signal output from the rear surface scanner 116 represents an image displayed on the rear surface of the document. These electric signals are converted into image data by an image processing unit 127, and output to the printer 130 or an external electronic device.

[Structure of Printer]

Figure 2B:
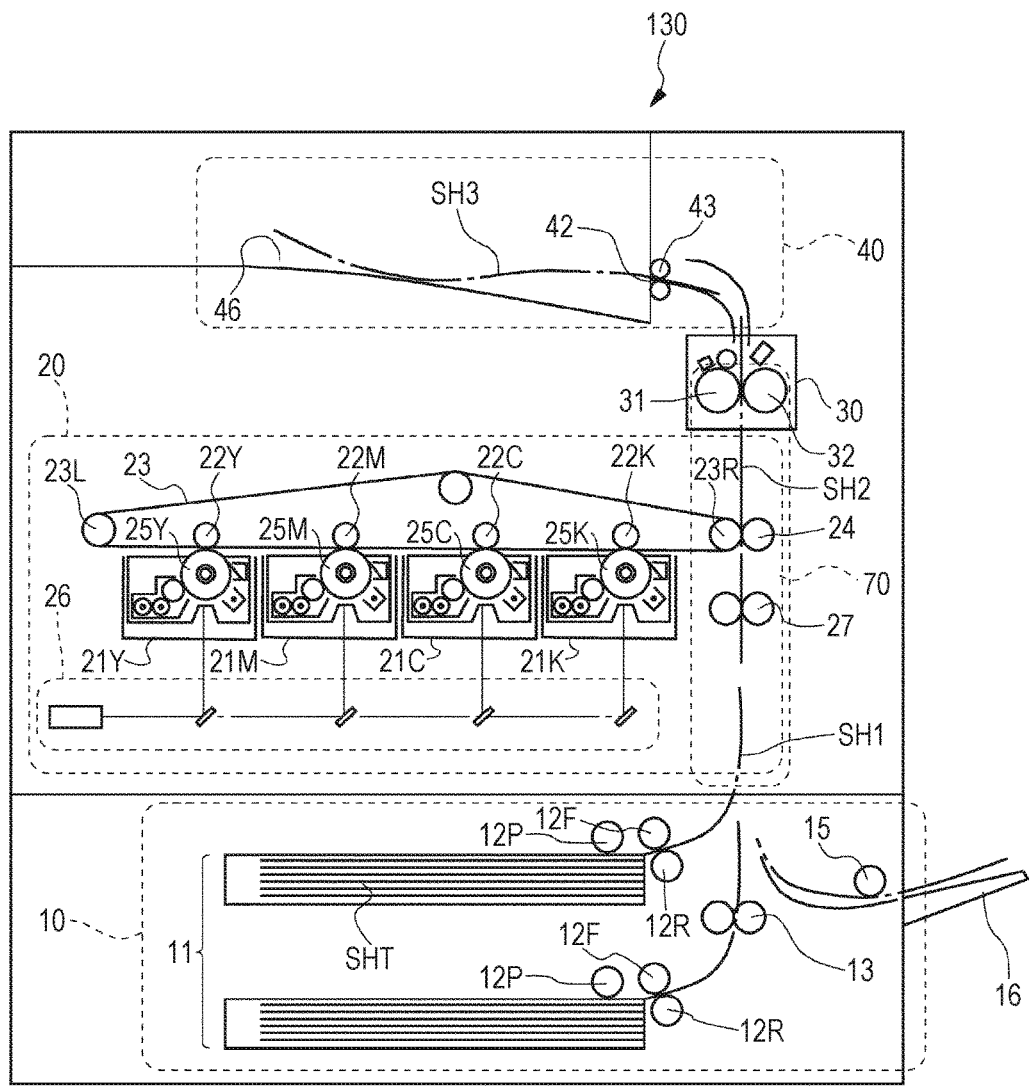
FIG. 2B is a front view schematically illustrating an internal structure of a printer illustrated in FIG. 1A.

FIG. 2B is a front view schematically illustrating the structure of the printer 130. FIG. 2B shows elements of the printer 130 as viewed through the front surface of the housing. As illustrated in FIG. 2B, the printer 130 is an electrophotographic color printer, i.e., a color laser printer, which includes a feed unit 10, an imaging unit 20, a fixing unit 30, and a discharge unit 40. These units operate in cooperation with each other to function as an image forming unit of the MFP 100, and form an image on a sheet based on image data.

The feed unit 10 feeds a sheet SHT one by one from feed cassettes 11 or a manual feed tray 16 to the imaging unit 20 by using delivery rollers 12P, 12F, 12R, 13, 14, and 15. The sheet SHT is made of paper or resin, for example. The types of the sheet SHT include plain paper, pure paper, color paper, and coating paper, for example. The sizes of the sheet SHT include A3, A4, A5, and B4, for example.

The imaging unit 20 forms a toner image on a sheet SH2 delivered from the feed unit 10. More specifically, each of four imaging units 21Y, 21M, 21C, and 21K initially exposes the front surfaces of photosensitive drums 25Y, 25M, 25C, and 25K with patterns based on the image data by using laser beams emitted from an exposure unit 26 to form an electrostatic latent image on each surface of the photosensitive drums. Each of the imaging units 21Y and others subsequently develops the corresponding electrostatic latent image with toner in the corresponding color of yellow (Y), magenta (M), cyan (C), and black (K). Toner images in four colors thus obtained are sequentially transferred from the surfaces of the photosensitive drums 25Y and others to the same position on the surface of an intermediate transfer belt 23 by utilizing an electric field generated between primary transfer rollers 22Y, 22M, 22C, and 22K and the photosensitive drums 25Y and others. As a result, one color toner image is formed at the corresponding position. This color toner image is transferred to the surface of the sheet SH2 inserted into a nip formed between the intermediate transfer belt 23 and a secondary transfer roller 24 by an electric field generated between the respective parts 23 and 24. Thereafter, separation voltage is applied to the sheet SH2 to remove the sheet SH2 from the secondary transfer roller 24. The separated sheet SH2 is delivered to the fixing unit 30.

The fixing unit 30 thermally fixes the toner image on the sheet SH2 delivered from the imaging unit 20. More specifically, when the sheet SH2 is inserted into a nip between a fixing roller 31 and a pressurizing roller 32, the fixing roller 31 heats the surface of the sheet SH2 by using a built-in heater. Simultaneously, the pressurizing roller 32 applies pressure to the heated portion of the sheet SH2 to press this portion against the fixing roller 31. The toner image is thus fixed to the front surface of the sheet SH2 by the heat from the fixing roller 31 and the pressure from the pressurizing roller 32. Thereafter, the fixing unit 30 delivers the sheet SH2 from an upper portion of the fixing unit 30 toward a discharge port 42 along a guide plate 41.

The discharge unit 40 receives the sheet SH2 from the fixing unit 30, and discharges the sheet SH2 through the discharge port 42 by using a discharge roller 43 to store the sheet SH2 in a discharge tray 46.

[Electronic Control System of Image Forming Apparatus]

Figure 3:
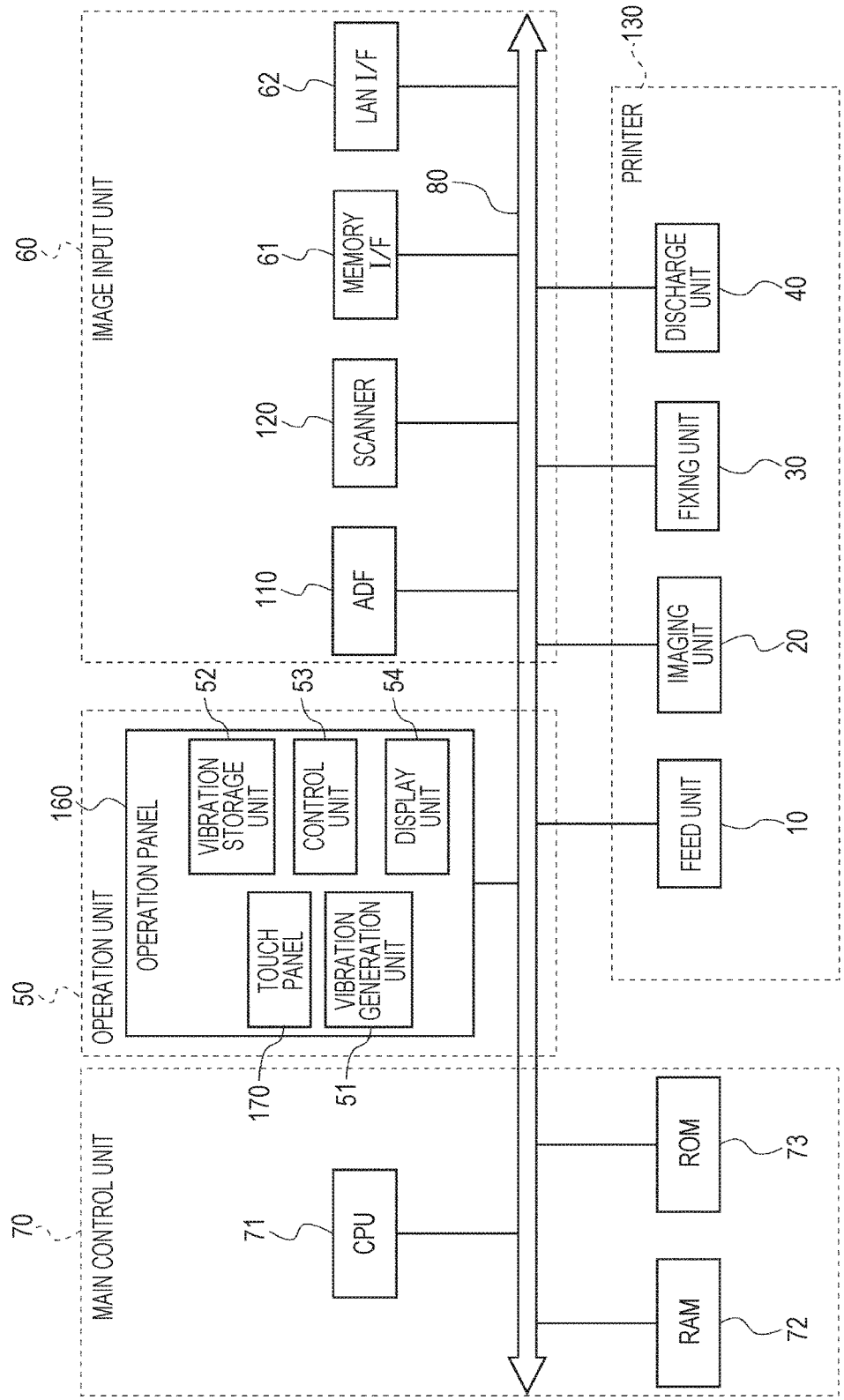
FIG. 3 is a block diagram illustrating a configuration of an electronic control system of the image forming apparatus illustrated in FIG. 1A.

FIG. 3 is a block diagram illustrating a configuration of an electronic control system of the MFP 100. As illustrated in FIG. 3, this system includes the image forming unit, i.e., the printer 130, an operation unit 50, an image input unit 60, and a main control unit 70 communicatively connected with each other via a bus 80.

—Operation Unit—

The operation unit 50 is an overall unit of input devices (UI) mounted on the MFP 100, such as an input device of the operation panel 160. The operation unit 50 receives and interprets operation from the user, and notifies the main control unit 70 about the received operation. Particularly, the operation panel 160 includes a vibration generation unit 51, a vibration storage unit 52, a control unit 53, and a display unit 54, in addition to the touch panel 170. The vibration generation unit 51 is a combination of the piezoelectric actuators 174 illustrated in FIG. 1B, and driving circuits of the piezoelectric actuators 174. The vibration generation unit 51 drives the piezoelectric actuators 174 to apply vibration to the touch panel 170, particularly to a display area of an operation screen included in the touch panel 170. The vibration storage unit 52 is constituted by a storage device such as a rewritable non-volatile semiconductor memory device including an EEPROM and a flash memory, and a storage device including a hard disk drive (HDD) and a solid-state drive (SSD). The vibration storage unit 52 stores vibration spectrums generated by operations of the ADF 110, the scanner 120, and the printer 130 as spectrums of background vibration. The control unit 53 is constituted by an integrated circuit such as a microprocessor (MPU/CPU), an ASIC, and an FPGA. The control unit 53 receives input operation from the user via the touch pad 172 illustrated in FIG. 1B, or the press buttons 161 illustrated in FIG. 1A, and interprets the received input operation. Thereafter, the control unit 53 creates information about the input operation based on the interpretation (hereinafter referred to as "operation information"), and transmits the created operation information to the main control unit 70. The display unit 54 is a combination of the LCD 171, the control circuit board 175, and the FPC 176 illustrated in FIG. 1B, and further a signal processing circuit (DSP) for supplying image data in appropriate modes to these parts 171, 175, and 176. The display unit 54 processes image data on the GUI screens such as the operation screen in accordance with instructions issued from the main control unit 70 to reproduce the GUI screens on the display area of the touch panel 170.

—Image Input Unit—

The image input unit 60 includes a memory interface (I/F) 61, and a network (LAN) I/F 62, in addition to the ADF 110 and the scanner 120 illustrated in FIG. 2A. The memory I/F 61 reads image data on a printing target from an external storage device such as a USB memory, an SSD, and an HDD via an image input terminal such as a USB port and a memory card slot, or writes image data extracted by the scanner 120 to these storage devices. The LAN I/F 62 is connected to an external LAN via wired or wireless connection to obtain image data on the printing target from an electronic device connected to the LAN, or transmits image data extracted by the scanner 120 to the electronic device.

—Main Control Unit—

The main control unit 70 is an integrated circuit mounted on one printing circuit board provided within the MFP 100. As illustrated in FIG. 3, the main control unit 70 includes a CPU 71, a RAM 72, and a ROM 73. The CPU 71 constituted by one MPU realizes various functions as a main controller for the parts 10, 20 through 50 and 60 by executing various types of firmware. For example, the CPU 71 allows the operation unit 50 to display the GUI screens such as the operation screen and receive input operation from the user through the GUI screens. The CPU 71 determines an operation mode of the MFP 100 such as an operating mode, a standby mode, and a sleeping mode in accordance with the input operation, and instructs the respective elements 10 through 60 to perform processes in accordance with the determined operation mode. The RAM 72 is a volatile semiconductor memory device such as a DRAM and an SRAM. The RAM 72 provides a working area for the CPU 71 during execution of the firmware by the CPU 71, and stores image data on the printing target received through the operation unit 50. The ROM 73 is constituted by a combination of a non-rewritable and non-volatile storage device, and a writable and non-volatile storage device. The former stores the firmware, while the latter includes a semiconductor memory device such as an EEPROM, a flash memory, an SSD, or an HDD, and provides a storage area for the CPU 71 for storing environment variables.

[Function of Operation Panel]

FIG. 4 is a function block diagram of the operation panel 160. As illustrated in FIG. 4, the touch panel 170 is a four-line resistive film system handling multi-touch. More specifically, the touch panel 170 includes a timing control unit 431, a voltage/current monitoring unit 432, an analog-digital (AD) conversion unit 433, a multi-touch determination unit 434, a distance measurement unit 435, and a coordinate calculation unit 436, in addition to the LCD 171, the touch pad 172, and other elements illustrated in FIG. 1B. These elements 431 through 436 correspond to modules of an electronic circuit, and are mounted on a printing circuit board contained in the operation panel 160 or incorporated in a single integrated circuit. The touch panel 170 detects contact between a finger of the user and the touch pad 172 by using the elements 431 through 436, and calculates coordinates at the contact point.

The control unit 53 functions as a user operation interpretation unit 531, a response control unit 532, and a display control unit 533 by executing firmware stored in the vibration storage unit 52 or in a non-volatile memory device different from the vibration storage unit 52. The user operation interpretation unit 531 interprets input operation from the user indicated by the touch pad 172 or the press buttons 161, and creates operation information. The response control unit 532 allows the touch panel 170 to perform the FFB function. More specifically, the response control unit 532 issues an instruction about a spectrum of response vibration to the vibration generation unit 51 in accordance with contact detection by the touch panel 170. The vibration generation unit 51 drives the piezoelectric actuators 174 in accordance with the instruction to generate response vibration from the touch pad 172. The display control unit 533 functions as a DSP for the LCD 171, the control circuit board 175, and the FPC 176. More specifically, the display control unit 533 processes image data shown on the GUI screen in accordance with the instruction from the main control unit 70, transmits the processed image data to the control circuit board 175, and allows the FPC 176 to modulate luminance of respective pixels of the LCD 171 based on the image data. As a result, the GUI screen is reproduced on the display area of the touch panel 170.

A communication unit 440 connects the control unit 53 to the bus 80 such that the control unit 53 becomes communicative through the bus 80. The communication unit 440 receives instructions, image data and the like from the main control unit 70, and transfers these to the control unit 53 via the bus 80. Moreover, the communication unit 440 transmits operation information and the like created by the control unit 53 to the main control unit 70.

—Contact Detection by Touch Panel—

The touch pad 172 includes two transparent rectangular conductive films (such as thin films of ITO) 401 and 402. The conductive films 401 and 402 overlap in parallel with each other with a fixed clearance left therebetween. The upper conductive film 401 includes a first electrode 421 and a second electrode 422 along one and the other short sides, respectively, and has constant electrical resistivity in the long side direction (X-axis direction in FIG. 4). The lower conductive film 402 includes a third electrode 423 and a fourth electrode 424 along one and the other long sides, respectively, and has constant electric resistivity in the short side direction (Y-axis direction in FIG. 4). Each of the electrodes 421 through 424 is connected to the voltage/current monitoring unit 432 via the cable 177.

The timing control unit 431 generates a timing signal TS having a constant frequency (such as several tens kHz) by using a built-in clock, and supplies the generated timing signal TS to the voltage/current monitoring unit 432. The voltage/current monitoring unit 432 alternately repeats following operations (1) and (2) in synchronization with the timing signal TS. (1) The voltage/current monitoring unit 432 applies bias voltage between the first electrode 421 and the second electrode 422 to monitor an amount of currents flowing between the first electrode 421 and the second electrode 422, and maintains the third electrode 423 and the fourth electrode 424 at high impedance (i.e., sufficiently higher resistance than the entire resistance of the respective conductive films 401 and 402) to monitor potentials of the third electrode 423 and the fourth electrode 424. (2) The voltage/current monitoring unit 432 applies bias voltage between the third electrode 423 and the fourth electrode 424 to monitor the amount of currents flowing between the third electrode 423 and the fourth electrode 424, and maintains the first electrode 421 and the second electrode 422 at high impedance to monitor potentials of the first electrode 421 and the second electrode 422. The AD conversion unit 433 converts analog values of the potential and the amount of currents measured by the voltage/current monitoring unit 432 into digital values.

The multi-touch determination unit 434 monitors a digital amount of currents output from the AD conversion unit 433, and notifies the coordinate calculation unit 436 about detection of a multi-touch when the amount of currents exceeds a reference value. This reference value represents an amount of currents flowing between the first electrode 421 and the second electrode 422 when the two conductive films 401 and 402 are short-circuited with each other only at one point during the period of the operation (1) performed by the voltage/current monitoring unit 432. On the other hand, the reference value represents an amount of currents flowing between the third electrode 423 and the fourth electrode 424 in the foregoing state during the period of the operation (2) performed by the voltage/current monitoring unit 432. When the two conductive films 401 and 402 are short-circuited with each other at two or more points, currents flow in both the conductive films 401 and 402 in parallel between the short-circuited points. In this condition, the resistance between the first electrode 421 and the second electrode 422 during the period of the operation (1), or the resistance between the third electrode 423 and the fourth electrode 424 during the period of the operation (2) becomes lower than the resistance at the time of short-circuit between the conductive films 401 and 402 only at one point. As a result, the amount of currents flowing between the pair of electrodes 421 and 422, or between the pair of electrodes 423 and 424 exceeds the reference value. This excess therefore indicates a state of short-circuit between the conductive films 401 and 402 at two or more points, i.e., a state of a multi-touch.

The distance measurement unit 435 monitors a digital amount of currents output from the AD conversion unit 433, and estimates the distance between two points of short-circuit based on the amount of currents, assuming that the two conductive films 401 and 402 are short-circuited at the two points. When the two conductive films 401 and 402 are short-circuited at two or more points, the resistance between the first electrode 421 and the second electrode 422 during the period of the operation (1), or the resistance between the third electrode 423 and the fourth electrode 424 during the period of the operation (2) becomes lower than the resistance in the condition of short-circuit at only one point as discussed above. In this case, the amount of each resistance drop is determined substantially based on the distance between the assumed two points of short-circuit of the two conductive films 401 and 402. By utilizing this relationship, the distance measurement unit 435 measures this distance based on the difference between the reference value and the amount of currents flowing between the pair of electrodes 421 and 422 or between the pair of electrodes 423 and 424.

The coordinate calculation unit 436 monitors digital values of potentials of the respective electrodes 421 through 424 output from the AD conversion unit 433, and calculates coordinates of a position of contact between the finger of the user and the touch panel 170 in the following manner based on the respective potentials.

During the period of the operation (1) performed by the voltage/current monitoring unit 432, a constant potential gradient is produced in the long side direction of the upper conductive film 401 (X-axis direction) by the bias voltage between the first electrode 421 and the second electrode 422 and the constant electrical resistance. When the upper conductive film 401 is short-circuited with the lower conductive film 402 within a certain range in this condition, the potential of each of the third electrode 423 and the fourth electrode 424, both of which are maintained at high impedance, becomes substantially equivalent to the potential at the center point of the short-circuit range. The potential at the center point is determined by a division ratio of a resistance between the first electrode 421 and the center point to a resistance between the center point and the second electrode 422. The potential gradient between the first electrode 421 and the second electrode 422 (X-axis direction) is kept constant. Accordingly, the division ratio is equivalent to an internal distance ratio of the first electrode 421 to the second electrode 422 divided by the center point, i.e., equivalent to a ratio of the distance between the first electrode 421 and the center point to the distance between the center point and the second electrode 422.

Accordingly, the coordinate calculation unit 436 initially detects a change of the potential at the third electrode 423 or the fourth electrode 424, and obtains a division ratio divided by the center point of the short-circuit range based on the changed potential, the potential of the first electrode 421 or the second electrode 422, and the bias voltage between the first electrode 421 and the second electrode 422. The coordinate calculation unit 436 subsequently calculates the distance between the center point and the first electrode 421 or the second electrode 422 based on the division ratio to determine this distance as a coordinate at the center point in the long side direction of the conductive films 401 and 402 (X coordinate in FIG. 4). When the output from the multi-touch determination unit 434 does not indicate detection of a multi-touch, the coordinate calculation unit 436 outputs the coordinate of the center point as the coordinate of the contact point in the long side direction of the conductive films 401 and 402 (X coordinate). When the output from the multi-touch determination unit 434 indicates detection of a multi-touch, the coordinate calculation unit 436 adds the half value of the distance output from the distance measurement unit 435 to the coordinate at the center point, and subtracts the same half value from the same coordinate. The coordinate calculation unit 436 outputs the two values thus obtained as coordinates (X coordinates) at two contact points in the long side direction of the conductive films 401 and 402.

During the period of the operation (2) performed by the voltage/current monitoring unit 432, a constant potential gradient is produced in the short side direction of the lower conductive film 402 (Y-axis direction) by the bias voltage between the third electrode 423 and the fourth electrode 424 and the constant electrical resistance. The potential of each of the first electrode 421 and the second electrode 422, both of which are maintained at high impedance, becomes substantially equivalent to the potential at the center point of the short-circuit range. The potential at the center point is determined by a division ratio of a resistance between the third electrode 423 and the center point to a resistance between the center point and the fourth electrode 424. This division ratio is equivalent to an internal distance ratio of the third electrode 423 to the fourth electrode 424 divided by the center point.

Accordingly, the coordinate calculation unit 436 initially detects a change of the potential at the first electrode 421 or the second electrode 422, and obtains a division ratio in the short-circuit range divided by the center point based on the changed potential, the potential of the third electrode 423 or the fourth electrode 424, and the bias voltage between the third electrode 423 and the fourth electrode 424. The coordinate calculation unit 436 subsequently calculates the distance between the center point and the third electrode 423 or the fourth electrode 424 based on the division ratio. The coordinate calculation unit 436 further outputs, as a coordinate at the contact point in the short side direction of the conductive films 401 and 402 (Y coordinate), the calculated distance, or the sum of the distance and the half value of the distance output from the distance measurement unit 435, or the difference between the distance and the half value of the distance output from the distance measurement unit 435, in accordance with the condition whether or not the output from the multi-touch determination unit 434 indicates detection of a multi-touch.

—Interpretation of User Operation—

The user operation interpretation unit 531 compares the coordinate at the contact point received from the coordinate calculation unit 436 with coordinates of gadgets such as virtual buttons and items of menus included in the GUI screen to estimate an operation target selected by the user from the gadgets. The user operation interpretation unit 531 further identifies types of gestures such as tap, flick, slide, and rotation based on a change of the coordinate with time at the contact point, and interprets the input operation indicated by the gesture of the user based on the identified type of the gesture and the gadget of the operation target. The user operation interpretation unit 531 further monitors whether or not the respective types of the press buttons 161 provided on the operation panel 160 have been pressed. When it is determined that any one of the press buttons 161 has been pressed, the user operation interpretation unit 531 identifies the pressed button, and interprets a process associated with the button, such as printing start and printing stop. The user operation interpretation unit 531 creates operation information based on this interpretation, and sends the created information to the main control unit 70.

—Storage of Background Vibration Spectrum—

A spectrum BVS of background vibration stored in the vibration storage unit 52 represents a spectrum of background vibration generated during operation of the ADF 110, the scanner 120, or the printer 130. The background vibration is transmitted to the operation panel 160 through the housing or the like of the MFP 100, and applied to the touch panel 170, more precisely, to the touch pad 172. In this case, the touch pad 172 is resonated by a component contained in the background vibration and coinciding with the natural frequency of the touch pad 172. Accordingly, the spectrum BVS of background vibration is represented by a combination of vibration levels, such as vibration intensity (acceleration of medium), for each natural frequency of the touch pad 172.

FIG. 5A is a list of node curves of natural vibration modes (m=1 through 3, n=1 through 3) of the touch pad 172. In FIG. 5A, each of rectangles represents a contour of the touch pad 172, while each of boundary lines between white areas and shaded areas represents a node of natural vibration, i.e., a portion where the vibration level steadily becomes "0". All of the sides of the touch pad 172 are fixed to the LCD 171, wherefore the nodes appear inside the touch pad 172 as lines parallel with the long sides or short sides of the touch pad 172 as illustrated in FIG. 5A. The natural vibration modes are identified based on a pair of values of these nodes (m, n). The value m indicates the sum of "1" and the number of the lines parallel with the long side, while the value n indicates the sum of "1" and the number of the lines parallel with the short side. In general, the natural frequency increases as the total number of the nodes calculated as (m+n−2) increases.

FIG. 5B shows schematic views illustrating vibration shapes of natural vibration modes (m, n)=(1, 1), (1, 2), (2, 1), while FIG. 5C shows graphs of vibration waveforms in the respective natural vibration modes. Curves illustrated in FIG. 5B show contours of the surface of the touch pad 172. Each of the graphs in FIG. 5C shows a change of acceleration a at one point in the surface of the touch pad 172 with time produced in accordance with a change of the height of the surface with time. As illustrated in FIG. 5B, no node appears inside the touch pad 172 in the lowest natural vibration mode (m, n)=(1, 1). Accordingly, the entire surface vibrates in the normal direction of the surface in the same phase, in which condition heights at respective points inside the surface change in the shape of a sine wave. In the subsequent natural vibration modes from the lowest mode, i. e., (m, n)=(1, 2) and (2, 1), only one node appears inside the touch pad 172. Surface portions on one and the other side of the node vibrate in the normal direction of the surface in the opposite phases. More specifically, when the surface portion on one side protrudes in a convex shape, the surface portion on the other side sinks in a concave shape. The heights at the respective points within each of the surface portions change in the same sine wave shape.

FIG. 5D is a graph of a vibration waveform actually generated in the touch pad 172. As illustrated in FIG. 5D, the waveform of actual vibration is considerably complicated. However, this vibration is produced by overlap of sine waves having various amplitudes $\Delta\alpha$ illustrated in FIG. 5C in various types of natural vibration modes illustrated in FIG. 5A. Accordingly, any vibration actually generated in the touch pad 172 is represented by a combination of the amplitudes $\Delta\alpha$ in the respective natural vibration modes (m, n).

FIG. 5E is a table showing the spectrums BVS of background vibration stored in the vibration storage unit 52. As illustrated in FIG. 5E, each of the spectrums BVS of background vibration is represented by a combination of the amplitudes $\Delta\alpha b$ in the respective natural vibration modes (m, n) of the touch pad 172 in each of the operation modes of the MFP 100, such as copying, printing, and scanning.

Background vibration generated by operation of the MFP 100 exhibits a typical spectrum in each of the operation modes. More specifically, the background vibration in the printing mode is overlap of a series of fixed vibration patterns produced during an action for delivering one sheet from the feed cassette 11 to the discharge tray 150 with delays of sheet delivery intervals. The background vibration in the scanning mode is overlap of fixed vibration patterns produced by reciprocating movement of the slider 123 of the scanner 120, and another fixed vibration patterns produced by an action for delivering a document from the feed tray 111 to the discharge tray 112 by using the ADF 110 in synchronization with the vibration patterns produced by the reciprocating movement of the slider 123. The background vibration in the copying mode is overlap of the background vibration in the printing mode and the background vibration in the scanning mode at fixed timing. As can be understood, the background vibration in each of the operation modes has typical patterns, wherefore a typical spectrum for each of the operation modes may be determined beforehand based on experiments or simulations in a manufacturing process. The typical spectrums are stored in the vibration storage unit 52 as the spectrums BVS of background vibration for the respective operation modes.

—Generation of Response Vibration (FFB)—

As illustrated in FIG. 4, the vibration generation unit 51 includes a driving unit 410. The driving unit 410 provided as a driving circuit for the piezoelectric actuators 174 cyclically applies voltage to the piezoelectric actuators 174. The driving unit 410 particularly matches a voltage waveform spectrum with a spectrum of response vibration instructed by the response control unit 532. Accordingly, the vibration spectrum given from the piezoelectric actuators 174 to the touch pad 172 becomes substantially equivalent to the instructed spectrum of response vibration.

The response control unit 532 sets the spectrum of response vibration in the following manner. The response control unit 532 initially recognizes contact detection by the touch panel 170 based on a state that the user operation interpretation unit 531 has received a coordinate at a contact point from the coordinate calculation unit 436. When the user operation interpretation unit 531 estimates a gadget of an operation target based on this reception, the response control unit 532 determines whether or not the corresponding gadget is a vibration response target. The vibration response target is selected from gadgets from which the user senses a response when touching the gadgets, such as a virtual button. When the gadget of the operation target is a response target by vibration, the response control unit 532 accesses the main control unit 70 to check whether the MFP 100 is in a standby state or an operating state. When the MFP 100 is in the standby state, the response control unit 532 sets a first spectrum to the spectrum of response vibration. For example, the first spectrum shows patterns different for each of the types of gadgets of the response target by vibration, such as virtual buttons, menus, and tool bars, or for each of the types of gestures of the response target by vibration, such as tap, flick, and slide. When the MFP 100 is in the operating state, the response control unit 532 accesses the main control unit 70 to check the current operation mode of the MFP 100, and searches the vibration storage unit 52 for the corresponding spectrum BVS of background vibration based on the checked operation mode. The response control unit 532 transforms the first spectrum into a second spectrum based on the spectrum BVS of background vibration, and sets the second spectrum to the spectrum of response vibration.

In this case, the response control unit 532 particularly sets a difference in vibration level between the first spectrum and the second spectrum or a ration of the first spectrum to the second spectrum for each of the natural frequencies of the touch pad 172. This setting is performed by either a method (A) or a method (B) shown below, for example. (A) At least any one of frequency components contained in the spectrum BVS of background vibration is added to the vibration level of an identical frequency component contained in the first spectrum. The calculated sum is set to the vibration level of an identical frequency component contained in the second spectrum. (B) A frequency component not contained in the spectrum BVS of background vibration is added to the first spectrum. The calculated spectrum is set to the second spectrum.

<First Method (A)>

Figure 6:
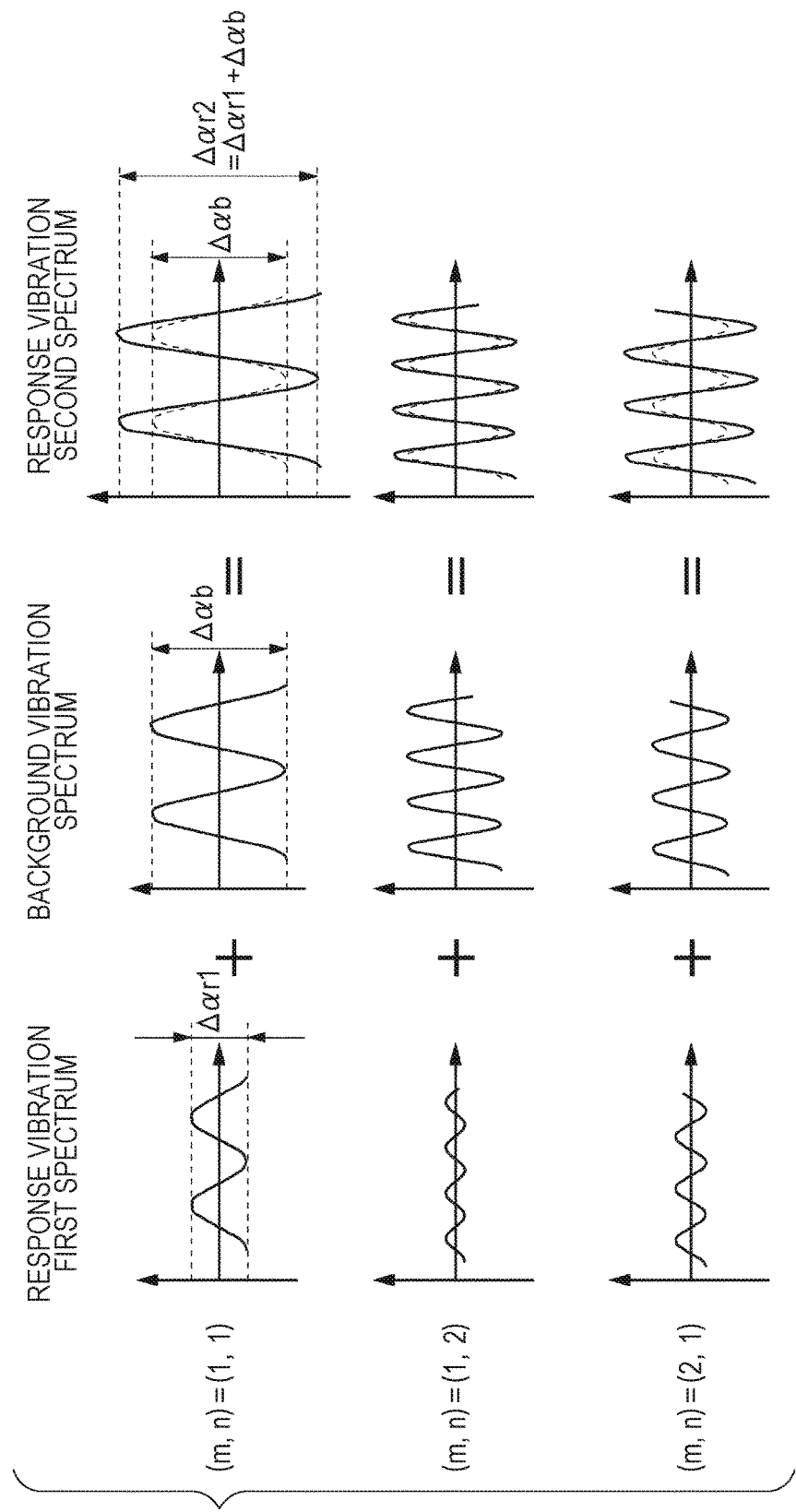
FIG. 6 shows graphs of a first method for transforming a spectrum of response vibration based on a spectrum of background vibration.

FIG. 6 illustrates graphs explaining the first method (A). As illustrated in FIG. 6, an amplitude $\Delta\alpha r_1$ for vibration intensity $\alpha$ is set for each of the natural vibration modes (m, n)=(1, 1), (1, 2), (2, 1) and others of the touch pad 172 in the first spectrum of response vibration. A combination of the amplitudes $\Delta\alpha r_1$ in these natural vibration modes (m, n) differs for each type of the gadgets or each type of the gestures of the response target by vibration. On the other hand, the spectrum BVS of background vibration specifies an amplitude $\Delta\alpha b$ for the vibration intensity $\alpha$ for each of the natural vibration modes (m, n) as illustrated in FIG. 5E. The response control unit 532 calculates the sum of the amplitudes $\Delta\alpha r_1$ and $\Delta\alpha b$ for each of the natural vibration modes, and sets the sum $\Delta\alpha r_1 + \Delta\alpha b$ to an amplitude $\Delta\alpha r_2$ of an identical frequency component contained in the second spectrum for the corresponding natural vibration mode ($\Delta\alpha r_2 = \Delta\alpha r_1 + \Delta\alpha b$).

According to this setting of the first method (A), the difference in amplitude between the first spectrum and the second spectrum ($\Delta\alpha r_2 - \Delta\alpha r_1$) becomes equivalent to the amplitude $\Delta\alpha b$. Even when the response vibration accidentally becomes the opposite phase to the background vibration in this method, the amplitude after cancellation by the background vibration remains substantially equivalent to the amplitude $\Delta\alpha r_1$ indicated in the first spectrum.

A time for continuation of the response vibration by the vibration generation unit 51 lies in a range from several tens of milliseconds to several hundreds of milliseconds, which is shorter than a typical continuation time of the background vibration in any of the operation modes, i.e., in a range from several seconds to several tens of seconds. Actually, the shortest continuation time of the background vibration in the printing mode is equivalent to a time required for delivering one sheet from the feed cassette 11 to the discharge tray 150. The shortest continuation time of the background vibration in the scanning mode is equivalent to a time required for one reciprocating movement of the slider 123 included in the scanner 120. The continuation time of the background vibration in the copying mode is substantially equivalent to the sum of the continuation time of the background vibration in the printing mode and the continuation time of the background vibration in the scanning mode.

Accordingly, the finger of the user contacting the operation screen senses, as the amplitude of the response vibration, not a synthesized amplitude of the response vibration immediately after the contact and the background vibration, but a change from this synthesized amplitude to the amplitude of only the background vibration after an elapse of the continuation time of the response vibration. More specifically, the finger of the user senses not the amplitude $\Delta\alpha r_2$ of the second spectrum, but the difference between the amplitude $\Delta\alpha r_2$ and the amplitude $\Delta\alpha b$ of only the background vibration spectrum, i.e., the amplitude of the first spectrum $\Delta\alpha r_1$.

According to the first method (A), therefore, the finger of the user senses response vibration similar to response vibration in the standby state even when the MFP 100 is in the operating state and producing background vibration.

<Second Method (B)>

Figure 7:
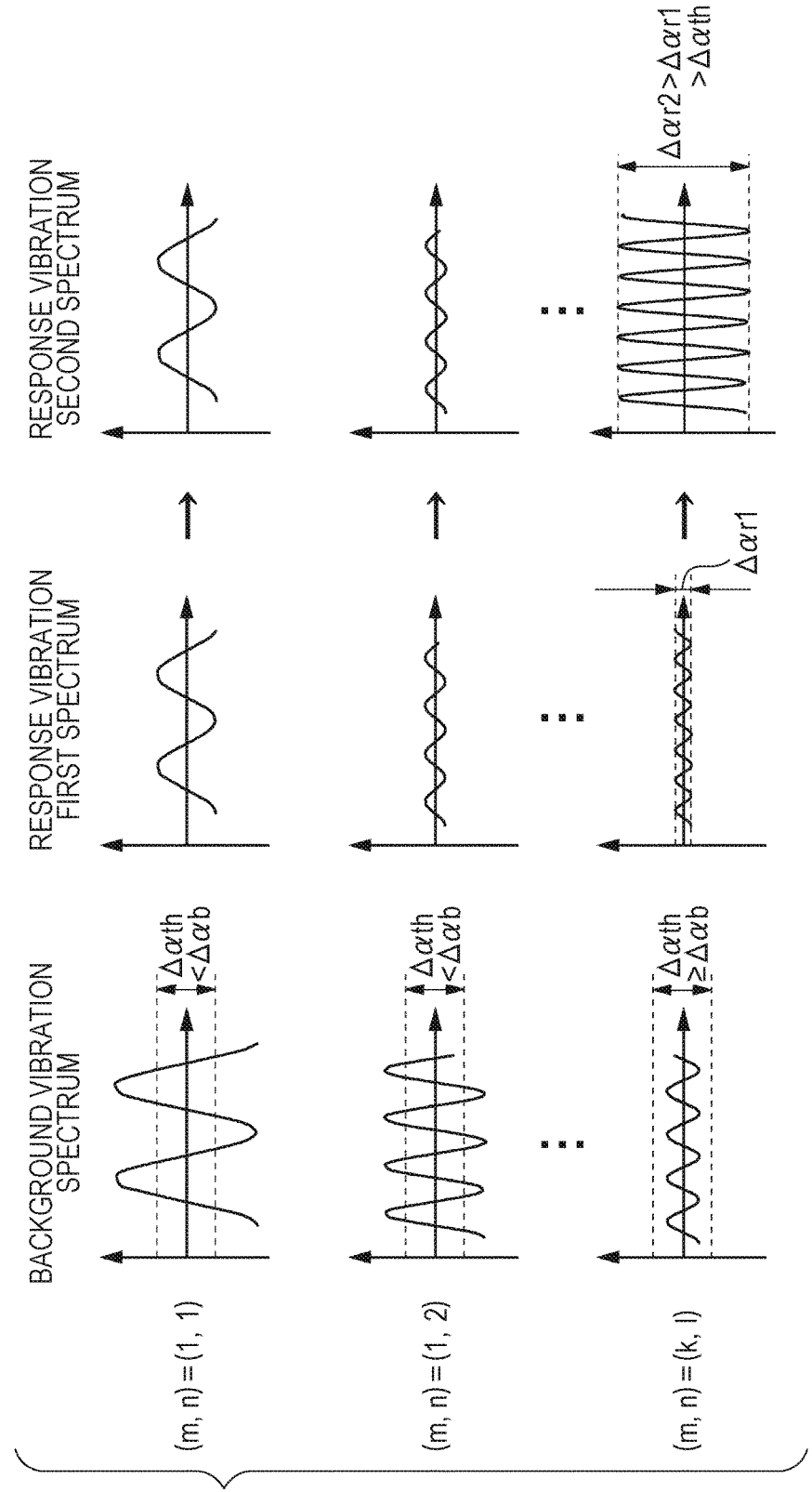
FIG. 7 shows graphs of a second method for transforming a spectrum of response vibration based on a spectrum of background vibration.

FIG. 7 illustrates graphs explaining the second method (B). As illustrated in FIG. 7, the amplitude $\Delta\alpha b$ for the vibration intensity $\alpha$ specified in the spectrum BVS of background vibration becomes a threshold $\Delta\alpha th$ or smaller at least in one mode (k, l) of the natural vibration modes (m, n) of the touch pad 172. The threshold $\Delta\alpha th$ is set to a value sufficiently smaller than a representative statistical value, such as the maximum value and the average value, in all of the amplitudes $\Delta\alpha b$ specified in the spectrum BVS of the corresponding background vibration. In this case, it is considered that the spectrum BVS of the background vibration does not practically contain frequency components having the amplitude $\Delta\alpha b$ equal to or smaller than the threshold $\Delta\alpha th$. Setting of the threshold $\Delta\alpha th$ in this manner is applicable to spectrums of background vibration in any operation modes of the MFP 100.

After the check of the operation mode of the MFP 100 and the search for the spectrum BVS of background vibration in the checked operation mode from the vibration storage unit 52, the response control unit 532 initially searches for natural vibration modes having amplitudes equal to or smaller than the threshold $\Delta\alpha th$ in the amplitudes $\Delta\alpha b$ specified in the searched spectrums BVS of the background vibration. Subsequently, the response control unit 532 selects at least one mode (k, l) from the searched natural vibration modes each of which contains a frequency component identical to a frequency component contained in the first spectrum. The response control unit 532 adds the identical frequency component of the selected natural vibration mode (k, l) to the first spectrum, and sets the resultant spectrum to the second spectrum. More specifically, the response control unit 532 initially amplifies the amplitude $\Delta\alpha r_1$ of the identical frequency component contained in the first spectrum for the corresponding natural vibration mode (k, l) such that the amplitude $\Delta\alpha r_1$ becomes larger than the threshold $\Delta\alpha th$ (K×$\Delta\alpha r_1$>$\Delta\alpha th$, amplification rate K>1). Subsequently, the response control unit 532 sets the amplified value to the amplitude $\Delta\alpha r_2$ of an identical frequency component contained in the second spectrum for the corresponding natural vibration mode ($\Delta\alpha r_2 = K \times \Delta\alpha r_1 > \Delta\alpha r_1$).

Accordingly, the second method (B) gives the second spectrum a frequency component which is not practically contained in the spectrum BVS of background vibration to sufficiently increase the amplitude $\Delta\alpha r_2$ of the second spectrum. As described above, the continuation time of the response vibration is shorter than the typical continuation time of background vibration in any of the operation modes. In this case, the finger of the user contacting the operation screen senses, as the frequency component of response vibration, the frequency component removed after an elapse of the continuation time of the response vibration in the frequency components contained in the synthesis of the response vibration immediately after the contact and the background vibration. In this case, the frequency component given to the second spectrum by the second method (B) is securely transmitted to the finger of the user as the response vibration. Accordingly, the second method (B) allows the finger of the user to clearly recognize the response vibration even in the presence of the background vibration during operation of the MFP 100.

[Flow of FFB Process by Touch Panel]

Figure 8:
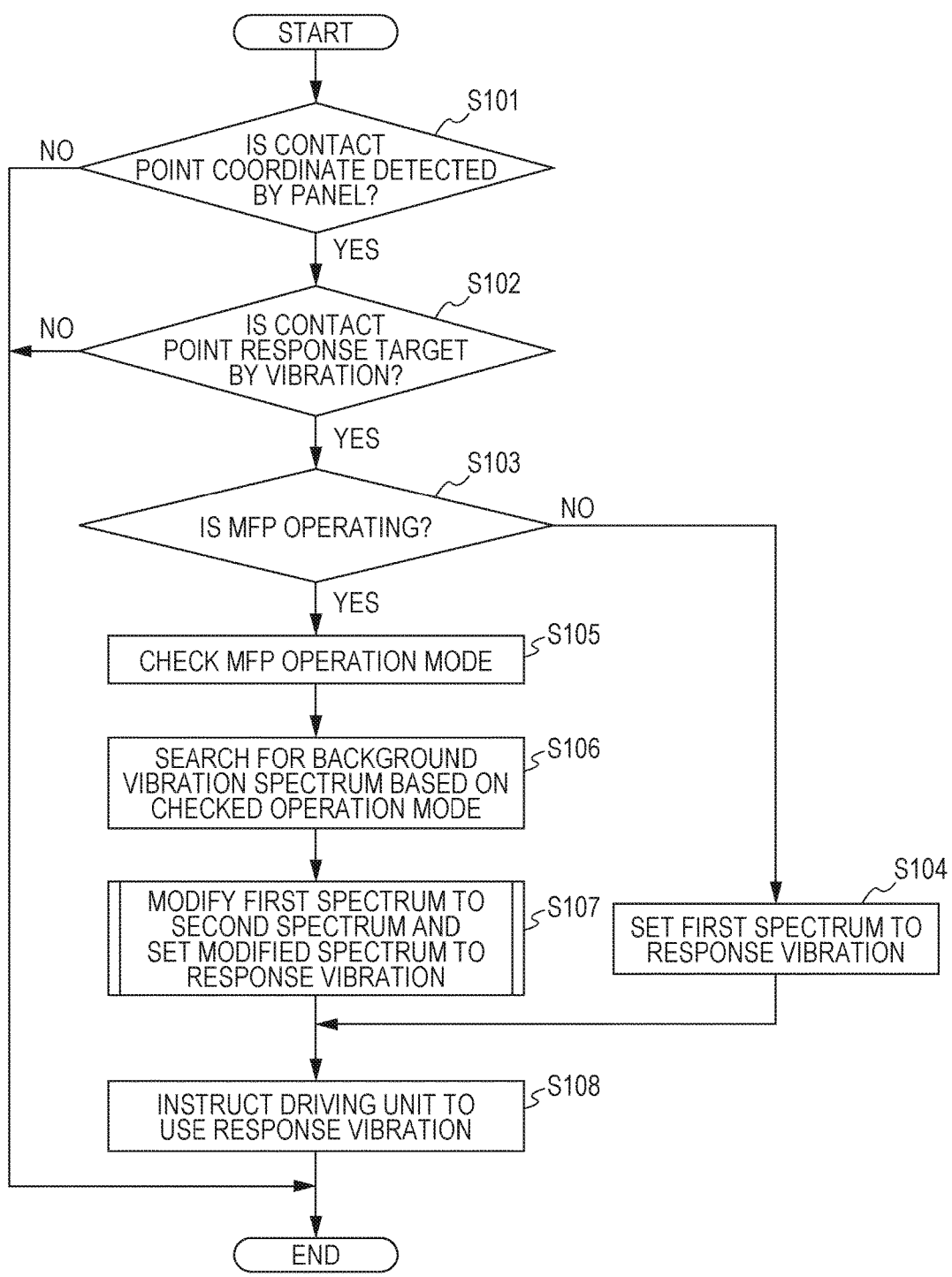
FIG. 8 is a flowchart of an FFB process performed by the touch panel.

FIG. 8 is a flowchart of an FFB process performed by the touch panel 170. This process starts when the display unit 54 reproduces the GUI screen such as the operation screen on the display area of the touch panel 170 in response to an instruction from the main control unit 70, and repeats regularly during a period of display of the GUI screen, such as for each horizontal scanning of the LCD 171, i.e., at a frequency of several tens kHz.

In step S101, the response control unit 532 checks whether or not the touch panel 170 has detected contact with the finger or the like of the user, more specifically, whether or not the user operation interpretation unit 531 has received a coordinate of a contact point from the coordinate calculation unit 436. When it is determined that the coordinate has been received, the process proceeds to step S102. When no coordinate is received, the process ends.

In step S102, it has been determined that the user operation interpretation unit 531 has received the coordinate of the contact point from the coordinate calculation unit 436. Accordingly, the response control unit 532 checks whether or not a gadget of a user operation target estimated by the user operation interpretation unit 531 corresponds to a response target by vibration based on the received coordinate. When the gadget is the response target, the process proceeds to step S103. When the gadget is not the response target, the process ends.

In step S103, it has been determined that the gadget of the operation target of the user is the response target by vibration. Accordingly, the response control unit 532 checks whether or not the MFP 100 is operating. When the MFP 100 is not operating, the process proceeds to step S104. When the MFP 100 is operating, the process proceeds to step S105.

In step S104, it has been determined that the MFP 100 is not in the operating state but in the standby state. Accordingly, the response control unit 532 sets the first spectrum to the spectrum of response vibration. Thereafter, the process proceeds to step S108.

In step S105, it has been determined that the MFP 100 is operating. Accordingly, the response control unit 532 accesses the main control unit 70, and checks the current operation mode of the MFP 100. Thereafter, the process proceeds to step S106.

In step S106, the response control unit 532 searches the vibration storage unit 52 for the spectrum BVS of background vibration corresponding to the operation mode checked in step S105. Thereafter, the process proceeds to step S107.

In step S107, the response control unit 532 transforms the first spectrum into the second spectrum based on the spectrum BVS of background vibration searched in step S106, and sets the second spectrum to the spectrum of response vibration. Thereafter, the process proceeds to step S108.

In step S108, the response control unit 532 issues an instruction indicating the spectrum of response vibration set in step S104 or step S107 to the driving unit 410 of the vibration generation unit 51. After this instruction, the process ends.

—Flow of Spectrum Transformation Process by First Method (A)—

Figure 9:
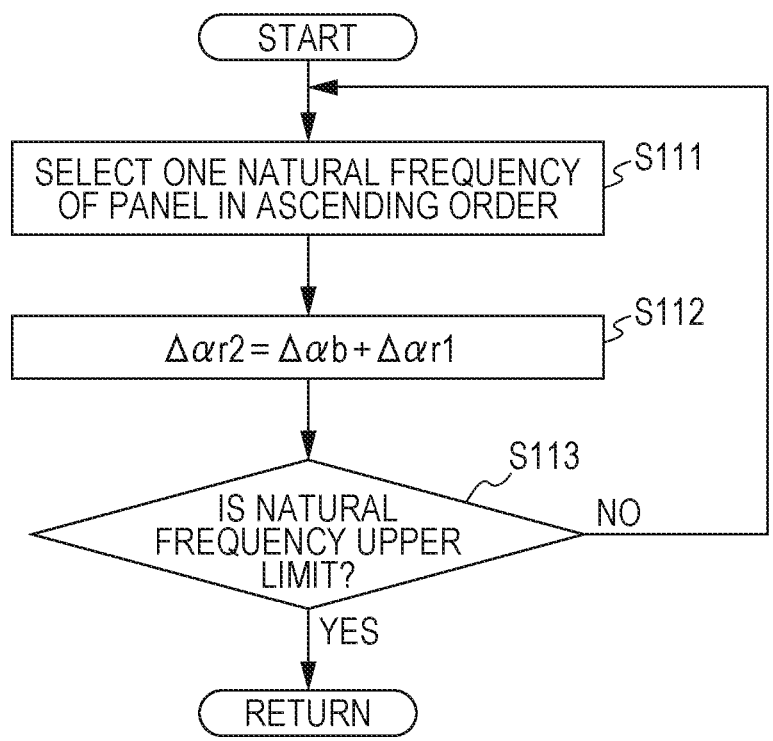
FIG. 9 is a flowchart of a sub routine for transforming a spectrum of response vibration in step S107 shown in FIG. 8 by the first method illustrated in FIG. 6.

FIG. 9 is a flowchart of a sub routine for transforming the spectrum of response vibration by the first method (A) in step S107.

In step S111, the response control unit 532 selects the natural vibration modes (m, n) of the touch pad 172 one by one in the ascending order of the natural frequency. Thereafter, the process proceeds to step S112.

In step S112, the response control unit 532 initially extracts the amplitudes $\Delta\alpha r_1$ and $\Delta\alpha b$ of an identical frequency component for the natural vibration mode (m, n) selected in step S111, from the first spectrum of response vibration and the spectrum BVS of background vibration searched from the vibration storage unit 52 in step S106, respectively. Subsequently, the response control unit 532 calculates the sum of the amplitudes $\Delta\alpha r_1$ and $\Delta\alpha b$, and sets the sum $\Delta\alpha r_1 + \Delta\alpha b$ to the amplitude $\Delta\alpha r_2$ of an identical frequency component contained in the second spectrum for the natural vibration mode ($\Delta\alpha r_2 = \Delta\alpha r_1 + \Delta\alpha b$). Thereafter, the process proceeds to step S113.

In step S113, the response control unit 532 checks whether or not the natural frequency of the natural vibration mode (m, n) selected in step S111 has reached an upper limit. This upper limit is set within a range of sensing allowed by the finger of the user. When the natural frequency is not the upper limit, the process is repeated from step S111. When the natural frequency is the upper limit, the process returns to step S108 in FIG. 8.

—Flow of Spectrum Transformation Process by Second Method (B)—

Figure 10:
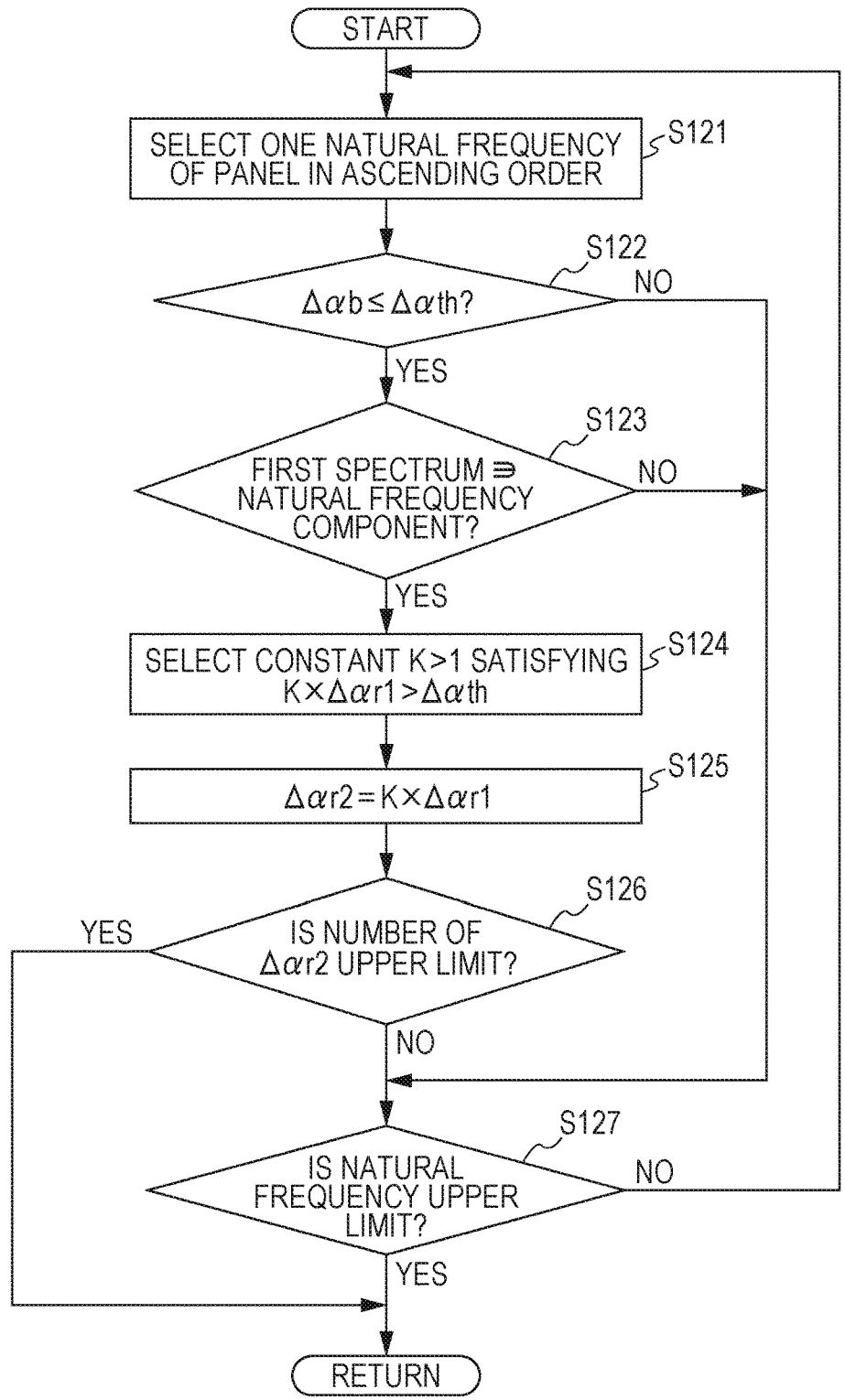
FIG. 10 is a flowchart of a sub routine for transforming a spectrum of response vibration in step S107 shown in FIG. 8 by the second method illustrated in FIG. 7.

FIG. 10 is a flowchart of a sub routine for transforming the spectrum of response vibration by the second method (B) in step S107.

In step S121, the response control unit 532 selects the natural vibration modes (m, n) of the touch pad 172 one by one in the ascending order of the natural frequency. Thereafter, the process proceeds to step S122.

In step S122, the response control unit 532 initially extracts, from the spectrum BVS of the background vibration searched from the vibration storage unit 52 in step S106, the amplitude $\Delta\alpha b$ of an identical frequency component for the natural vibration mode (m, n) selected in step S121, and checks whether or not the extracted amplitude $\Delta\alpha b$ is the threshold $\Delta\alpha th$ or smaller. When the amplitude $\Delta\alpha b$ is the threshold or smaller, the process proceeds to step S123. When the amplitude cab exceeds the threshold, the process proceeds to step S127.

In step S123, it has been determined that the amplitude $\Delta\alpha b$ extracted from the spectrum BVS of background vibration is the threshold $\Delta\alpha th$ or smaller. In this case, the response control unit 532 checks whether or not the first spectrum contains a frequency component identical to the frequency component of the natural vibration mode (m, n)

selected in step S121. When the first spectrum contains this frequency component, the process proceeds to step S124. When the first spectrum does not contain this frequency component, the process proceeds to step S127.

In step S124, it has been determined that that the first spectrum contains the frequency component identical to the frequency component of the natural vibration mode (m, n) selected in step S121. In this case, the response control unit 532 extracts the amplitude $\Delta\alpha r_1$ of this frequency component from the first spectrum, and sets the amplification rate K as K>1 such that the amplified amplitude $\Delta\alpha r_1$ exceeds the threshold $\Delta\alpha th$ (K×$\Delta\alpha r_1$>$\Delta\alpha th$). Thereafter, the process proceeds to step S125.

In step S125, the response control unit 532 sets the value amplified in step S124 (K×$\Delta\alpha r_1$) to the amplitude $\Delta\alpha r_2$ of an identical frequency component contained in the second spectrum for the natural vibration mode (m, n) selected in step S121 ($\Delta\alpha r_2$=K×$\Delta\alpha r_1$). Thereafter, the process proceeds to step S126.

In step S126, it is checked whether or not the number of the amplitudes $\Delta\alpha r_2$ set in step S125 has reached an upper limit. This upper limit is set to the total number of the frequency components contained in the first spectrum or smaller. When the number of the amplitudes $\Delta\alpha r_2$ does not reach the upper limit, the process proceeds to step S127. When the number of the amplitudes $\Delta\alpha r_2$ is the upper limit, the process returns to step S108 in FIG. 8.

In step S127, the response control unit 532 checks whether or not the natural frequency of the natural vibration mode (m, n) selected in step S121 has reached the upper limit. This upper limit is set within a range of sensing allowed by the finger of the user. When the natural frequency is not the upper limit, the process is repeated from step S121. When the natural frequency is the upper limit, the process returns to step S108 in FIG. 8.

Advantages of Embodiment

As described above, the response control unit 532 of the operation panel 160 incorporated in the MFP 100 according to the embodiment of the present invention sets a difference between the amplitude $\Delta\alpha r_1$ of the response vibration indicated by the first spectrum and the amplitude $\Delta\alpha r_2$ of the response vibration indicated by the second spectrum, or a ratio of the two amplitudes, for each of the natural vibration modes (m, n) of the touch pad 172 based on the spectrum BVS of background vibration stored in the vibration storage unit 52. According to this structure, the second spectrum is set such that a user securely senses a difference between vibration before overlap of response vibration on the background vibration and vibration after the overlap. Accordingly, the operation panel 160 allows the user to securely sense the response vibration even in the presence of the background vibration generated by operation of the MFP 100.

Moreover, the vibration storage unit 52 stores the spectrums BVS of background vibration. In this case, a processing time required for setting the second spectrum based on the spectrum BVS decreases in comparison with a processing time based on actual measurement of the spectrum of background vibration for each occasion. As a result, a delay produced by the difference between contact detection by the touch panel 170 and output of the response vibration in response to the detection decreases. In this case, variations of the delay decreases accordingly. Consequently, the user further securely senses the foregoing difference in vibration.

MODIFIED EXAMPLES (A) The image forming apparatus 100 illustrated in FIG. 1A is an MFP. The image forming apparatus according to the embodiment of the present invention is applicable to other single-function devices, such as laser printers, inkjet printers or other single-function printers, copying machines, scanners, facsimile machines.

(B) The touch panel 170 illustrated in FIG. 4 is a four-line resistive film type panel handling multi-touch by using two resistive films. The touch panel may be constituted by other known types of touch panels such as a five-line resistive film type panel, a resistive film type panel handing multi-touch by using a plurality of resistive films in matrix, a capacitance type panel, and an optical type panel. In any type of structures, the vibration generation unit is capable of vibrating the touch pad in contact with a finger of a user, or a protection part for covering the touch pad such as a sheet, a film, and a panel.

(C) The vibration generation unit 51 uses the pair of the piezoelectric actuators 174 illustrated in FIGS. 1B and 4 to vibrate the touch pad 172. The positions of the piezoelectric actuators are not limited to the location illustrated in these figures, but may be located on every side of the touch pad 172. The vibration generation unit may be constituted by an eccentric motor, a voice coil motor or the like to vibrate the touch pad 172 instead of the piezoelectric actuators.

(D) Each spectrum of the background vibration and the response vibration illustrated in FIGS. 5A through 7 represents the vibration level for the vibration intensity α, i.e., acceleration of the medium. Each spectrum may represent a speed or displacement of the medium instead of acceleration.

(E) According to the first method (A) illustrated in FIG. 6, the response control unit 532 adds the amplitude cab of the background vibration to the amplitude $\Delta\alpha r_1$ of the first spectrum, and sets the resultant amplitude to the amplitude $\Delta\alpha r_2$ of the second spectrum. Alternatively, the response control unit 532 may amplify the amplitude $\Delta\alpha r_1$ of the first spectrum, and add the amplified amplitude $\Delta\alpha r_1$ to the amplitude $\Delta\alpha b$ of the background vibration ($\Delta\alpha r_2$=K1×$\Delta\alpha r_1$+$\Delta\alpha b$, K1>1). In this case, the amplitude of the response vibration becomes larger than the amplitude $\Delta\alpha r_1$ indicated in the first spectrum by an amplitude rate K1 even after cancellation by the background vibration. In addition, the finger of the user contacting the operation screen senses the amplitude rate K1×$\Delta\alpha r_1$, which is larger than the amplitude $\Delta\alpha r_1$ indicated in the first spectrum by the amplitude rate K1, as a change from the synthesized amplitude of the response vibration immediately after contact and the background vibration to the amplitude of only the background amplitude after an elapse of the continuation time of the response vibration. In this case, the finger of the user senses larger response vibration in the operating state of the MFP 100 than in the standby state. Accordingly, the operation panel allows the finger of the user to securely sense the response vibration even in the presence of the background vibration during operation of the MFP 100.

(F) According to the first method (A) illustrated in FIG. 6, the response control unit 532 adds the amplitudes $\Delta\alpha b$ of all the frequency components contained in the spectrum BVS of the background vibration to the amplitudes $\Delta\alpha r_1$ of the identical frequency components contained in the first spectrum. Alternatively, the response control unit may select some of the frequency components contained in the spectrum BVS of background vibration, and add the amplitudes of only the selected frequency components to the amplitudes of the identical frequency components contained in the first spectrum.

(G) According to the second method (B) illustrated in FIG. 7, the response control unit 532 searches for the natural vibration modes equal to or smaller than the threshold $\Delta\alpha$th in the amplitudes $\Delta\alpha$b specified in the spectrum BVS of background vibration, and selects at least one (k, l) mode from the natural vibration modes each of which contains a frequency component identical to the frequency component of the first spectrum. When the first spectrum does not contain a frequency component identical to the frequency component of any of the natural vibration modes, the response control unit 532 may select at least one (k, l) from the natural vibration modes, and give a new frequency component identical to the frequency component of the selected natural vibration mode (k, l) to the second spectrum to set the amplitude $\Delta\alpha r_2$ to a value larger than the threshold $\Delta\alpha$th.

(H) According to the second method (B), the response control unit 532 selects the natural vibration mode where the amplitude $\Delta\alpha$b specified in the spectrum BVS of background vibration exceeds the threshold $\Delta\alpha$th, like the natural vibration modes (m, n)=(1, 1) and (1, 2), and sets an identical frequency component contained in the first spectrum for the selected natural vibration mode to an identical frequency component of the second spectrum. Alternately, the response control unit may remove this frequency component from the second spectrum.

(I) The response control unit 532 transforms the spectrums by changing the amplitudes of the respective frequency components of the response vibration (including addition and removal of the frequency components) between the standby state and the operating state of the MFP 100, and further between the different operation modes. In addition, the response control unit may change the continuation time of the response vibration.

When the scanner 120 scans a document carried on the platen glass 122, for example, the continuation time of the background vibration is equivalent to a time required for reciprocating movement of the slider 123. This time is relatively short, wherefore the response control unit may increase the continuation time of the response vibration longer than continuation time of the background vibration. In this case, the response vibration is transmitted to the finger of the user when the finger keeps contacting the touch pad 172 after completion of the reciprocating movement of the slider 123.

When a section exhibiting sufficiently low vibration intensity $\alpha$ appears sufficiently long in the overall waveform of the background vibration illustrated in FIG. 5D, such as the case when intervals for delivering sheets are set extremely long in the printing mode, the continuation time may be prolonged such that this section easily overlaps with the continuation time of the response vibration.

(J) The spectrum of the background vibration shown in the table in FIG. 5E specifies one amplitude $\Delta\alpha$ of an identical frequency component for each of the natural vibration modes (m, n) of the touch pad 172 in each of the operation modes of the MFP 100. The vibration storage unit 52 may further store changes with time produced in the spectrum of the background vibration during a period from a start of a series of operations by the MFP 100 to completion of the operations, such as a period of delivery of one sheet from the feed cassette 11 to the discharge tray 150 in the printing mode. In this case, the spectrum of the background vibration specifies a plurality of possible values of amplitudes of an identical frequency component during the period of the series of operations in the respective natural vibration modes (m, n) of the touch pad 172.

Figures 11A, 11B:
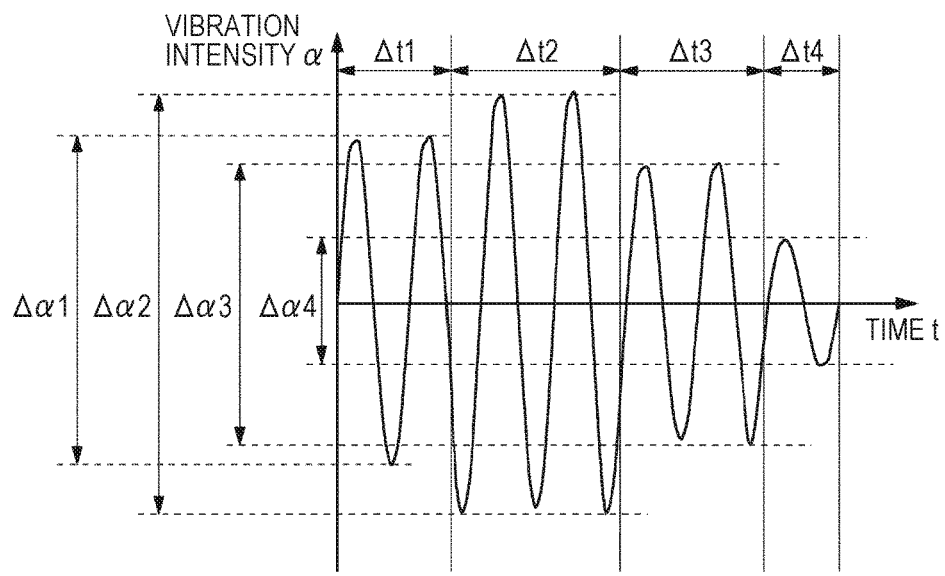

FIG. 11A is a graph showing a change with time produced in one frequency component of the background vibration during one sheet copying by the MFP 100. As illustrated in FIG. 11A, the amplitude of the frequency component changes in four stages during the period of one sheet copying by the MFP 100. In a first period from a start of copying to an elapse of a first continuation time $\Delta$t1, the amplitude is maintained at a first stage c$\alpha$1. In a second period from immediately after the first period to an elapse of a second continuation time $\Delta$t2, the amplitude is maintained at a second stage $\Delta\alpha$2. In a third period from immediately after the second period to an elapse of a third continuation time $\Delta$t3, the amplitude is maintained at a third stage $\Delta\alpha$3. In a fourth period from immediately after the third period to an elapse of a fourth continuation time $\Delta$t4 and completion of one sheet copying, the amplitude is maintained at a fourth stage $\Delta\alpha$4.

FIG. 11B is a correspondence table of the natural vibration mode (m, n) producing a change with time in the spectrum of the background vibration, and a continuation time $\Delta$tk (k=1, 2, 3, and others) for each amplitude $\Delta\alpha$k. The spectrum contained in this table is a spectrum determined beforehand based on experiments or simulations as a typical spectrum of the background vibration generated during one sheet copying by the MFP 100. The change with time produced in the spectrum of the background vibration is stored in the vibration storage unit 52 in the form of a table as illustrated in the figure.

The response control unit 532 measures an elapsed time from a start of one sheet copying by the MFP 100. When the touch panel 170 detects contact, the response control unit 532 initially obtains a measurement of the elapsed time in response to a state that the user operation interpretation unit 531 has received a coordinate of a contact point from the coordinate calculation unit 436. Subsequently, the response control unit 532 compares the measurement and the correspondence table shown in FIG. 5E to determine the spectrum of the background vibration to be used for setting the second spectrum. More specifically, the response control unit 532 searches the correspondence table shown in FIG. 5E for the amplitudes of the respective frequency components of the background vibration at the time indicated by the measurement of the elapsed time.

In case of an identical frequency component contained in the background vibration for the primary natural vibration mode (1, 1) (hereinafter abbreviated as "primary frequency component"), for example, the time from the copying start to the elapse of the first period (k=1) continues for a continuation time of the first period, i.e., $\Delta$t1=250 milliseconds. The time until the elapse of the second period (k=2) continues for the sum of the continuation time of the first period and the continuation time of the second period, i.e., $\Delta$t1+$\Delta$t2=250+300=550 milliseconds. When the measurement indicates 500 milliseconds, the time indicated by the measurement belongs to the second period, wherefore the response control unit 532 searches the correspondence table for the amplitude of the second stage $\Delta\alpha$2 in case of the primary frequency component of the background vibration. Amplitudes of other frequency components are similarly searched.

(K) The operation unit 50 may customize a response vibration in accordance with preferences of the user. More specifically, the operation unit 50 may allow the display unit 54 to display a setting screen associated with response vibration to be generated by the vibration generation unit 51 as a part of an operation screen. Through this setting screen, the operation unit 50 receives from the user input of indexes indicating preferences of the user associated with response vibration (hereinafter referred to as "preference index"), such as an increase or decrease amount of an amplitude of a response vibration, and upper and lower limit levels to be set for the amplitudes. The operation unit 50 also stores the received preference indexes in the ROM 73 of the main control unit 70 as one of environment variables. The response control unit 532 corrects the second spectrum based on the preference indexes.

For example, the user selects any one of three level indexes of "high", "middle", and "low" for intensity of the response vibration through the operation unit 50. The response control unit 532 corrects the amplitude $\Delta \alpha r_2$ of each of the frequency components specified in the second spectrum of the response vibration by +5 dB, 0 dB, or −5 dB in accordance with the selected index.

Alternatively, the user sets an upper limit $\Delta \alpha$max and a lower limit min for the amplitude of the response vibration through the operation unit 50. The response control unit 532 selects the amplitude $\Delta \alpha r_2$ of the frequency component specified in the second spectrum of the response vibration in excess of the upper limit $\Delta \alpha$max, and replaces the selected amplitude $\Delta \alpha r_2$ with the upper limit $\Delta \alpha$max. The response control unit 532 selects the amplitude $\Delta \alpha r_2$ of the frequency component specified in the second spectrum of the response vibration in short of the lower limit $\Delta \alpha$min, and replaces the selected amplitude $\Delta \alpha r_2$ with the lower limit $\Delta \alpha$min.

Figure 12:
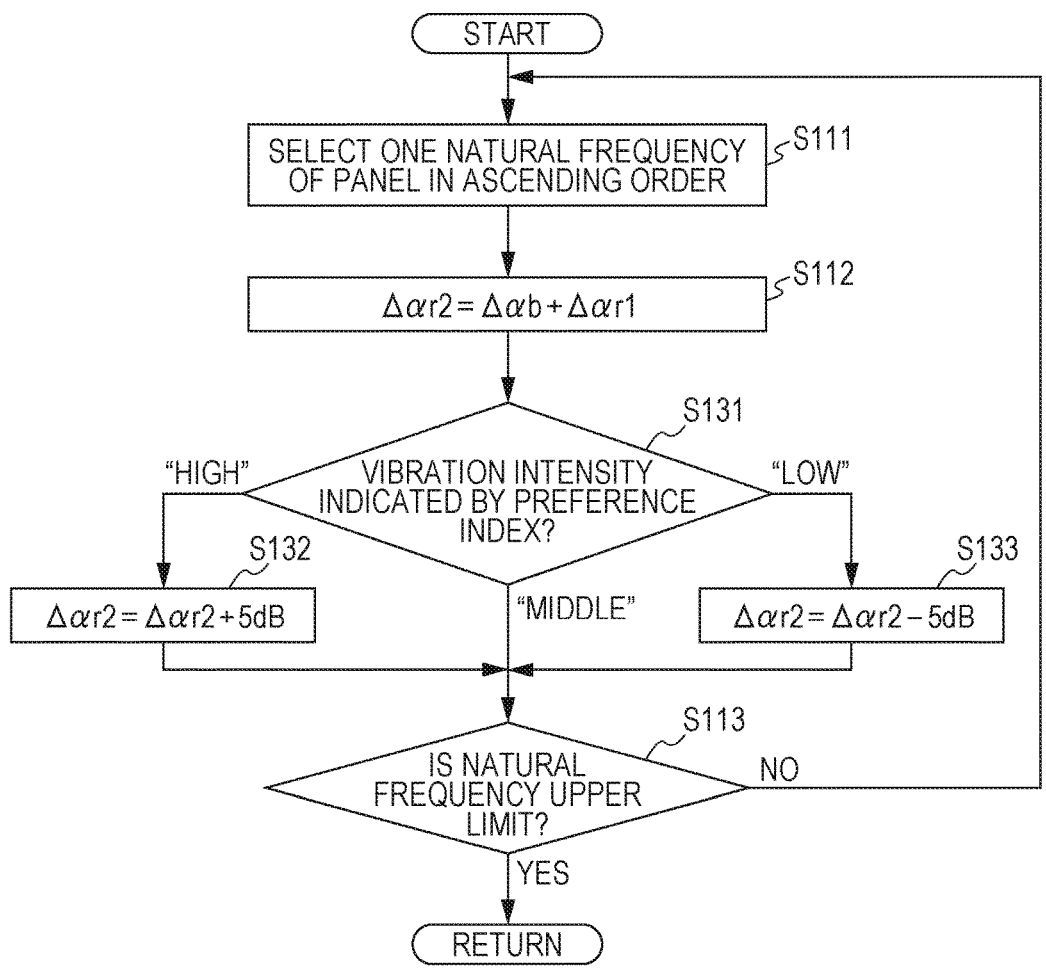
FIG. 12 is a flowchart of a sub routine which adds a process to the process shown in FIG. 9 to increase or decrease an amplitude of response vibration in accordance with a preference of a user.

FIG. 12 is a flowchart of a sub routine of a process for increasing or decreasing an amplitude of response vibration in accordance with a preference of the user. This sub routine is added to the process (see FIG. 9) for transforming the spectrum of the response vibration by the first method (A) in step S107 shown in FIG. 8. As can be seen from FIG. 12, this process is similar to the process shown in FIG. 9 except for the point in that steps S131 through S133 are added between steps S112 and S113. Similar steps are given similar reference numbers shown in FIG. 9.

In step S111, the response control unit 532 selects the natural vibration modes (m, n) of the touch pad 172 one by one in the ascending order of the natural frequency. Thereafter, the process proceeds to step S112.

In step S112, the response control unit 532 calculates the sum of the amplitudes $\Delta \alpha r_1$ and $\Delta \alpha b$ of each frequency component contained in the first spectrum of the response vibration and in the spectrum BVS of background vibration, respectively, and sets the sum $\Delta \alpha r_1 + \Delta \alpha b$ to the amplitude $\Delta \alpha r_2$ of an identical frequency component of the second spectrum ($\Delta \alpha r_2 = \Delta \alpha r_1 + \Delta \alpha b$). Thereafter, the process proceeds to step S131.

In step S131, the response control unit 532 accesses the main control unit 70, and reads a preference index of the user from environment variables stored in the ROM 73. When the intensity of the response vibration indicated by the preference index is "high", the process proceeds to step S132. When the intensity of the response vibration is "middle", the process proceeds to step S113. When the intensity of the response vibration is "low", the process proceeds to step S133.

In step S132, it has been determined that the intensity of the response vibration indicated by the preference index is "high". Accordingly, the response control unit 532 corrects the amplitude $\Delta \alpha r_2$ of each frequency component specified in the second spectrum of response vibration by +5 dB. Thereafter, the process proceeds to step S113.

In step S133, it has been determined that the intensity of the response vibration indicated by the preference index is "low". Accordingly, the response control unit 532 corrects the amplitude $\Delta \alpha r_2$ of each frequency component specified in the second spectrum of response vibration by −5 dB. Thereafter, the process proceeds to step S113.

In step S113, it has been determined that the intensity of the response vibration indicated by the preference index is "middle", or the response control unit 532 has already corrected the second spectrum of the response vibration in accordance with the preference index. Accordingly, the response control unit 532 checks whether or not the natural frequency of the natural vibration mode (m, n) selected in step S111 has reached the upper limit. When the natural frequency is not the upper limit, the process is repeated from step S111. When the natural frequency is the upper limit, the process returns to step S108 in FIG. 8.

Figure 13:
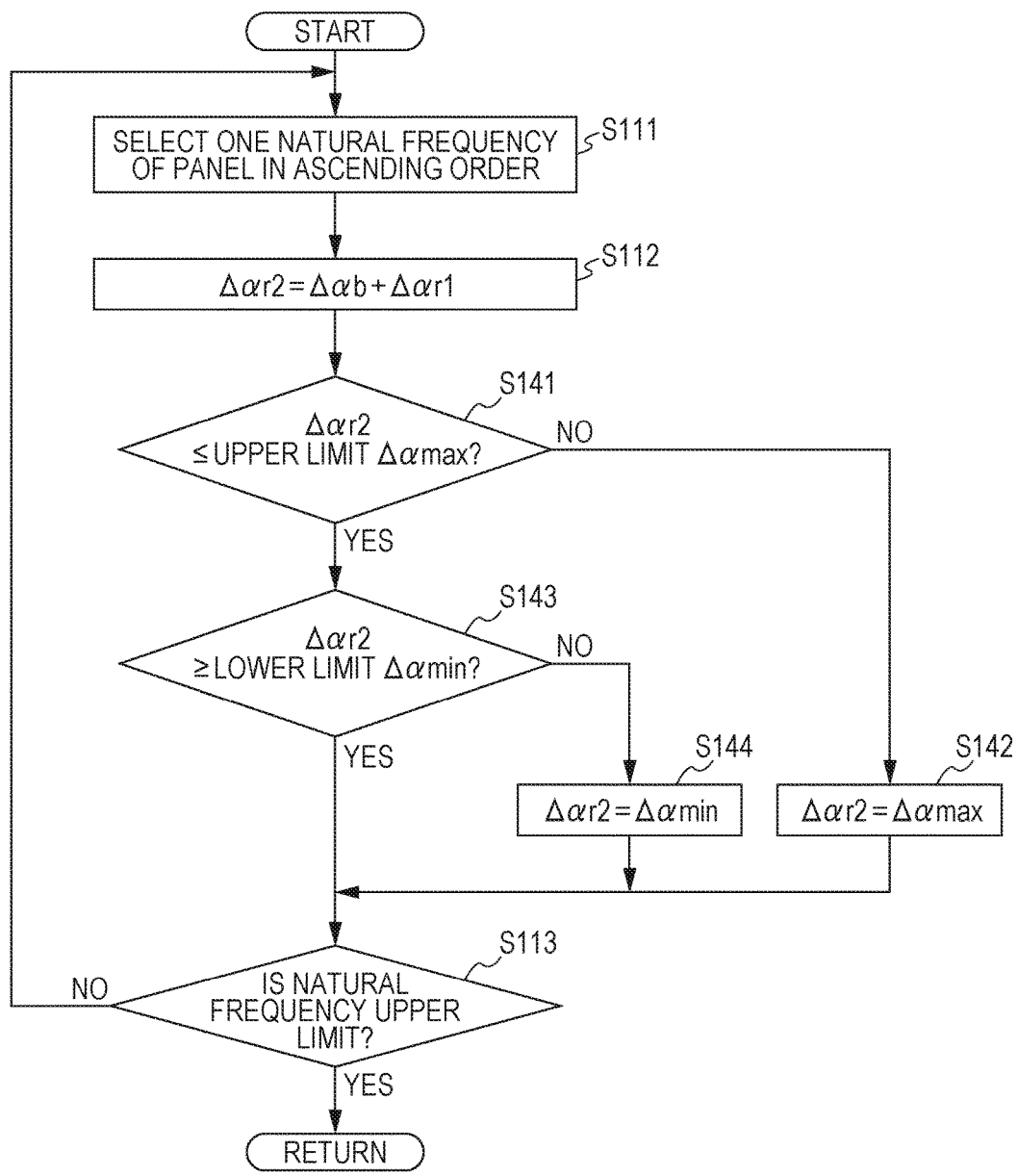
FIG. 13 is a flowchart of a sub routine which adds a process to the process shown in FIG. 9 to limit a vibration level of a second spectrum.

FIG. 13 is a flowchart of a sub routine of a process for limiting the amplitude of the response vibration in accordance with the preference of the user. This sub routine is added to the process for transforming the spectrum of the response vibration by the first method (A) (see FIG. 9) in step S107 shown in FIG. 8. As can be seen from FIG. 13, this process is similar to the process shown in FIG. 9 except for the point that steps S141 through S144 are added between steps S112 and S113. Similar steps are given similar reference numbers shown in FIG. 9.

In step S111, the response control unit 532 selects the natural vibration modes (m, n) of the touch pad 172 one by one in the ascending order of the natural frequency. Thereafter, the process proceeds to step S112.

In step S112, the response control unit 532 calculates the sum of the amplitudes $\Delta \alpha r_1$ and $\Delta \alpha b$ of each frequency component contained in the first spectrum of the response vibration and in the spectrum BVS of background vibration, respectively, and sets the sum $\Delta \alpha r_1 + \Delta \alpha b$ to the amplitude $\Delta \alpha r_2$ of an identical frequency component of the second spectrum ($\Delta \alpha r_2 = \Delta \alpha r_1 + \Delta \alpha b$). Thereafter, the process proceeds to step S141.

In step S141, the response control unit 532 initially accesses the main control unit 70, and reads a preference index of the user from environment variables stored in the ROM 73. Subsequently, the response control unit 532 compares the upper limit $\Delta \alpha$max of the amplitude of the response vibration indicated by the preference index with the amplitude $\Delta \alpha r_2$ of an identical frequency component specified in the second spectrum of response vibration for the natural vibration mode (m, n) selected in step S111, and checks whether or not the amplitude $\Delta \alpha r_2$ is the upper limit $\Delta \alpha$max or smaller. When the $\Delta \alpha r_2$ is the upper limit $\Delta \alpha$max or smaller, the process proceeds to step S143. When the $\Delta \alpha r_2$ exceeds the upper limit $\Delta \alpha$max, the process proceeds to step S142.

In step S142, it has been determined that the amplitude $\Delta \alpha r_2$ specified in the second spectrum of the response vibration exceeds the upper limit $\Delta \alpha$max. Accordingly, the response control unit 532 replaces the amplitude $\Delta \alpha r_2$ with the upper limit $\Delta \alpha$max. Thereafter, the process proceeds to step S113.

In step S143, it has been determined that the amplitude $\Delta \alpha r_2$ specified in the second spectrum of the response vibration is the upper limit $\Delta \alpha$max or smaller. Accordingly, the response control unit 532 further checks whether or not the amplitude $\Delta \alpha r_2$ is the lower limit $\Delta \alpha$min of the amplitude of the response vibration indicated by the preference index or smaller. When the $\alpha r_2$ is the lower limit $\Delta\alpha$min or larger, the process proceeds to step S113. When the $\Delta\alpha r_2$ is smaller than the lower limit $\Delta\alpha$min, the process proceeds to step S144.

In step S144, it has been determined that the amplitude $\Delta\alpha r_2$ specified in the second spectrum of the response vibration is smaller than the lower limit $\Delta\Delta$min. Accordingly, the response control unit 532 replaces the amplitude $\Delta\alpha r_2$ with the lower limit $\Delta\alpha$min. Thereafter, the process proceeds to step S113.

In step S113, the response control unit 532 checks whether or not the natural frequency of the natural vibration mode (m, n) selected in step S111 has reached an upper limit. When the natural frequency is not the upper limit, the process is repeated from step S111. When the natural frequency is the upper limit, the process returns to step S108 in FIG. 8.

(L) During operation of the MFP 100, the response control unit 532 searches the vibration storage unit 52 for the spectrum BVS of background vibration for the current operation mode of the MFP 100, and sets the spectrum of the response vibration based on the searched spectrum BVS. In this case, the response control unit 532 may correct the spectrum BVS of background vibration based on the total operation time of the MFP 100.

A change produced in the background vibration increases as the total operation time of the MFP 100 becomes longer. In this case, the amplitudes of the respective frequency components of the background vibration particularly become larger. This change is chiefly produced by increase in "backlash" between respective parts of the MFP 100 in accordance with increase in abrasion of delivery rollers and the like, plastic deformation of chassis or the like, or looseness of screws or the like. On the other hand, the spectrum BVS of the background vibration stored in the vibration storage unit 52 is determined based on experiments or simulations in the manufacturing process of the MFP 100. Accordingly, errors contained in the spectrum BVS of background vibration from the actual spectrum increase as the total operation time of the MFP 100 becomes longer.

These errors are correctable by the following method, for example. Initially, a monitoring unit for monitoring the total operation time of the MFP 100 is added to the operation panel 160. For example, the monitoring unit is a function unit realized by execution of firmware by the control unit 53 similarly to the user operation interpretation unit 531, the response control unit 532, and the display control unit 533. The monitoring unit regularly accesses the main control unit 70 to obtain the total number of sheets processed by the printer 130, or the total consumption amount of toner. The number of sheets or the consumption amount is correlated with the total operation time of the MFP 100, while the operation time is correlated with the amplitude increase rate of the response vibration. Accordingly, these correlations are determined beforehand based on experiments or simulations, and stored in the vibration storage unit 52. The response control unit 532 increases the amplitudes of the respective frequency components specified in the spectrum BVS of background vibration at a rate corresponding to the total number of sheets or the total consumption amount of toner (hereinafter referred to as "aging coefficient") based on these correlations. The errors produced by aging between the spectrum BVS and the actual spectrum are thus correctable.

Figure 14A:
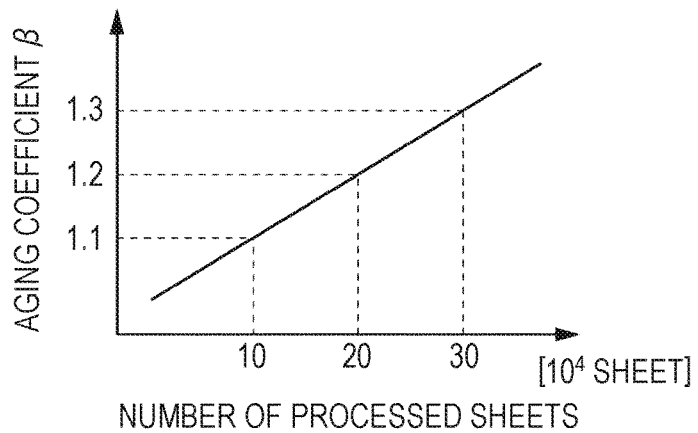

FIG. 14A is a graph showing a correlation between the total number of sheets processed by the printer 130 and an aging coefficient $\beta$. The "aging coefficient" is defined as a ratio of a value of an amplitude of each frequency component of the background vibration after aging to a value indicated by the corresponding amplitude at the time of manufacture. As illustrated in FIG. 14A, increase in the aging coefficient $\beta$ is substantially proportional to increase in the total number of processed sheets. Formulae and tables showing this graph are stored in the vibration storage unit 52 as well as the spectrum BVS of background vibration. The response control unit 532 refers to these formulae or tables while reading the spectrum BVS of the background vibration from the vibration storage unit 52, and utilizes the formulae or tables for correction of the spectrum BVS.

Figure 14B:
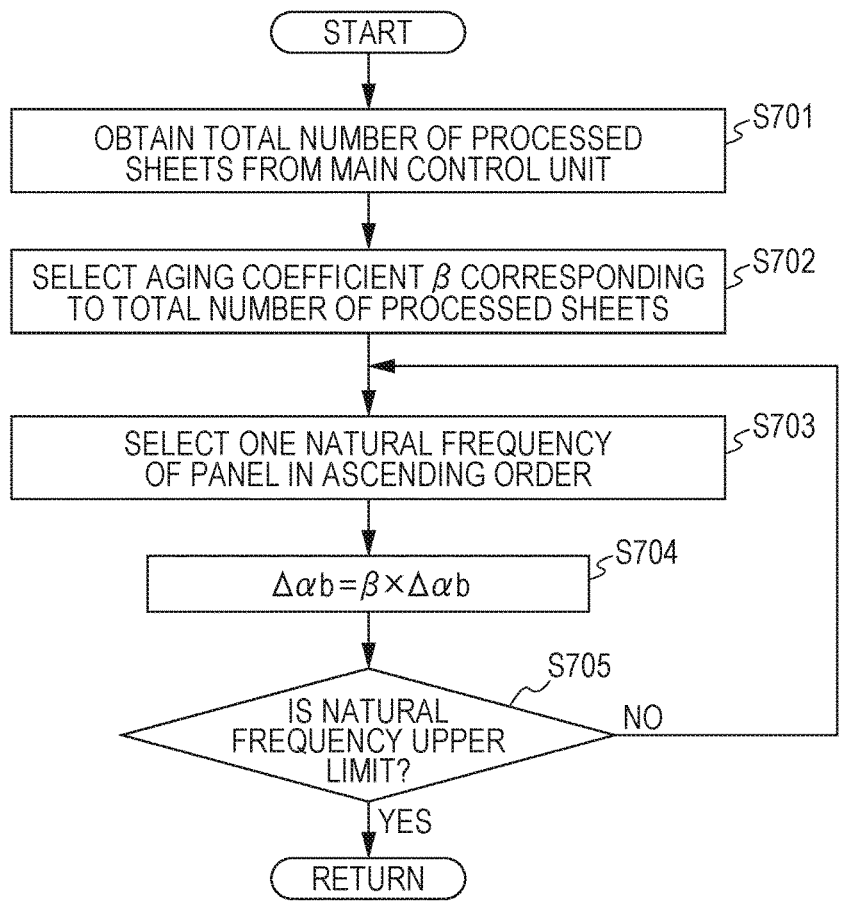
FIG. 14B is a flowchart of correction for a spectrum of background vibration using the aging coefficient.

FIG. 14B is a flowchart for correction of the spectrum of the background vibration using the aging coefficient $\beta$. This process is executed immediately after step S106 shown in FIG. 8, for example.

In step S701, the monitoring unit obtains the total number of sheets processed by the printer 130 from the main control unit 70. Thereafter, the process proceeds to step S702. In step S702, the response control unit 532 accesses the vibration storage unit 52 to refer to formulae or tables indicating correlations between the aging coefficient $\beta$ and the total number of processed sheets, and selects a value of the aging coefficient $\beta$ corresponding to the number of processed sheets obtained in step S701. Thereafter, the process proceeds to step S703.

In step S703, the response control unit 532 selects the natural vibration modes (m, n) of the touch pad 172 one by one in the ascending order. Thereafter, the process proceeds to step S704.

In step S704, the response control unit 532 extracts the amplitude $\Delta\alpha$b of an identical frequency component for the natural vibration mode (m, n) selected in step S703 from the spectrum BVS of background vibration. The response control unit 532 calculates the product of the extracted amplitude $\Delta\alpha$b by the aging coefficient $\beta$ selected in step S702, and replaces the value of the amplitude with the product $\beta \times \Delta\alpha$b ($\Delta\alpha$b=$\beta \times \Delta\alpha$b). Thereafter, the process proceeds to step S705.

In step S705, the response control unit 532 checks whether or not the natural frequency of the natural vibration mode (m, n) selected in step S111 has reached the upper limit. When the natural frequency is not the upper limit, the steps are repeated from step S703. When the natural frequency is the upper limit, the process returns to step S107 shown in FIG. 8.

The present invention relates to an operation panel. As described above, a spectrum of response vibration during operation of an apparatus incorporating the operation panel is transformed from a spectrum of response vibration during standby, based on a spectrum of background vibration stored in the operation panel. It is therefore obvious that the invention is applicable to industrial use.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An operation panel that is incorporated in an apparatus generating vibration during operation, and displays an operation screen of the apparatus to receive operation from a user through the operation screen, the operation panel comprising:
    a touch panel that includes a display area of the operation screen, and detects contact between an external object and the display area;

a vibration generation unit that applies vibration to the display area;

a vibration storage unit that stores a spectrum of vibration generated by operation of the apparatus as a spectrum of background vibration; and a response control unit that checks whether the apparatus is in a standby state or an operating state in response to contact detection by the touch panel, and causes the vibration generation unit to apply, in response to the contact, vibration indicating a first spectrum to the display area when the apparatus is in the standby state, and vibration indicating a second spectrum to the display area when the apparatus is in the operating state, wherein the response control unit sets a difference between the first spectrum and the second spectrum or a ratio of the first spectrum to the second spectrum for each of natural frequencies of the display area based on the spectrum of the background vibration.

2. The operation panel according to claim 1, wherein the response control unit adds a vibration level of at least any one of frequency components contained in the spectrum of the background vibration to a vibration level of an identical frequency component contained in the first spectrum, and sets the sum of the vibration levels to a vibration level of an identical frequency component contained in the second spectrum.

3. The operation panel according to claim 1, wherein the response control unit adds a frequency component not contained in the spectrum of the background vibration to the first spectrum, and sets the resultant spectrum to the second spectrum.

4. The operation panel according to claim 1, wherein the vibration storage unit further stores a change with time produced in the spectrum of the background vibration during a period from a start of a series of operations performed by the apparatus to an end of the operations, and the response control unit measures an elapsed time from the start of the series of operations performed by the apparatus, and determines a spectrum of the background vibration to be used for setting the second spectrum based on a measurement of the elapsed time at the time of detection of the contact detected by the touch panel.

5. The operation panel according to claim 4, wherein the apparatus is an image forming apparatus, and the change with time produced in the spectrum of the background vibration stored in the vibration storage unit indicates a change with time produced when the image forming apparatus prints one sheet.

6. The operation panel according to claim 1, wherein the vibration storage unit stores the spectrum of the background vibration for each operation mode of the apparatus, and the response control unit identifies the operation mode of the apparatus, and determines the spectrum of the background vibration to be used for setting the second spectrum in accordance with the identified operation mode when the apparatus is in the operating state at the time of detection of the contact detected by the touch panel.

7. The operation panel according to claim 6, wherein the apparatus is a copying machine, and the vibration storage unit separately stores the spectrum of the background vibration for each of a scanning mode, a copying mode, and a printing mode.

8. The operation panel according to claim 1, wherein the operation screen includes a setting screen associated with vibration to be generated by the vibration generation unit, and the response control unit corrects the second spectrum in accordance with operation by the user through the setting screen.

9. The operation panel according to claim 8, wherein the correction of the second spectrum by the response control unit includes increase or decrease in the vibration level, or setting of an upper limit or a lower limit for the vibration level.

10. The operation panel according to claim 1, further comprising a monitoring unit that monitors total operation time of the apparatus, wherein the response control unit corrects the spectrum of the background vibration in accordance with the total operation time indicated by the monitoring unit.

11. The operation panel according to claim 10, wherein the apparatus is an image forming apparatus, and the monitoring unit estimates the total operation time based on the total number of sheets processed by the image forming apparatus, or the total amount of toner or ink consumed by the image forming apparatus.

12. An image forming apparatus comprising:

an image forming unit that forms an image on a sheet; and the operation panel according to claim 1, the operation panel displaying an operation screen for the image forming unit to receive operation from a user through the operation screen.

* * * * *